United States Patent
Seshadri et al.

(10) Patent No.: US 12,332,864 B2
(45) Date of Patent: *Jun. 17, 2025

(54) KEY-VALUE STORE AND FILE SYSTEM INTEGRATION

(71) Applicant: NetApp Inc., San Jose, CA (US)

(72) Inventors: Sanjay Subramanian Seshadri, Sunnyvale, CA (US); Arindam Banerjee, Fremont, CA (US); Manan Dahyabhai Patel, Sunnyvale, CA (US); Raymond Jordan Go, Burbank, CA (US); Anil Paul Thoppil, Pleasanton, CA (US); Ananthan Subramanian, San Ramon, CA (US); Santhosh Selvaraj, San Jose, CA (US); Nikul Y. Patel, San Jose, CA (US); Vikhyath Rao, Sunnyvale, CA (US); Meera Odugoudar, Milpitas, CA (US); Kevin Daniel Varghese, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,940

(22) Filed: Oct. 23, 2023

(65) Prior Publication Data

US 2024/0045848 A1    Feb. 8, 2024

Related U.S. Application Data

(63) Continuation of application No. 17/234,894, filed on Apr. 20, 2021, now Pat. No. 11,797,510.

(51) Int. Cl.
*G06F 16/21*    (2019.01)
*G06F 16/215*    (2019.01)
(Continued)

(52) U.S. Cl.
CPC ........ *G06F 16/2246* (2019.01); *G06F 16/215* (2019.01); *G06F 16/217* (2019.01);
(Continued)

(58) Field of Classification Search
None
See application file for complete search history.

(56) References Cited

U.S. PATENT DOCUMENTS

| 8,184,953 B1 | 5/2012 | Covell et al. |
| 2011/0246503 A1* | 10/2011 | Bender ............... G06F 9/546 |
| | | 707/769 |

(Continued)

OTHER PUBLICATIONS

Cho B., et al., "Taking Advantage of a Disaggregated Storage and Compute Architecture", Feb. 2018, Databricks, cited on the Internet at: https://databricks.com/session/taking-advantage-of-a-disaggregated-storage-and-compute-architecture, pp. 1-3.

(Continued)

*Primary Examiner* — Dawaune A Conyers
(74) *Attorney, Agent, or Firm* — Cooper Legal Group, LLC

(57) ABSTRACT

Techniques are provided for key-value store and file system integration to optimize key value store operations. A key-value store is integrated within a file system of a node. A log structured merge tree of the key-value store may be populated with a key corresponding to a content hash of a value data item stored separate from the key. A random distribution search may be performed upon a sorted log of the log structured merge tree to identify the key for accessing the value data item. A starting location for the random distribution search is derived from key information, a log size of the sorted log, and/or a keyspace size of a keyspace associated with the key.

20 Claims, 14 Drawing Sheets

(51) Int. Cl.
*G06F 16/22* (2019.01)
*G06F 16/2455* (2019.01)
*G06F 16/2457* (2019.01)
*G06F 16/248* (2019.01)

(52) U.S. Cl.
CPC .. *G06F 16/24553* (2019.01); *G06F 16/24573* (2019.01); *G06F 16/248* (2019.01)

(56) References Cited

U.S. PATENT DOCUMENTS

| | | | |
|---|---|---|---|
| 2012/0036163 | A1 | 2/2012 | Myers et al. |
| 2014/0279946 | A1 | 9/2014 | Scarpino et al. |
| 2017/0212680 | A1 | 7/2017 | Waghulde |
| 2018/0089244 | A1 | 3/2018 | Velayudhan Pillai et al. |
| 2018/0225322 | A1 | 8/2018 | Boles et al. |
| 2020/0333968 | A1* | 10/2020 | Bortnikov ........... G06F 16/9024 |
| 2021/0165805 | A1 | 6/2021 | Xie |
| 2021/0181968 | A1 | 6/2021 | Jain et al. |
| 2021/0216517 | A1 | 7/2021 | Graefe |
| 2021/0240674 | A1* | 8/2021 | Agrawal ........... G06F 16/24539 |
| 2021/0279205 | A1 | 9/2021 | Irazabal |
| 2021/0334206 | A1* | 10/2021 | Colgrove ............. G06F 3/0638 |
| 2021/0397345 | A1 | 12/2021 | Jawahar et al. |
| 2022/0050807 | A1* | 2/2022 | Ramdasi ............. G06F 16/1734 |
| 2022/0129445 | A1 | 4/2022 | Helland |
| 2022/0188317 | A1* | 6/2022 | Fanghaenel ............. G06F 16/86 |
| 2022/0197904 | A1* | 6/2022 | Gillis ................. G06F 16/2455 |
| 2022/0335027 | A1 | 10/2022 | Subramanian Seshadri et al. |

OTHER PUBLICATIONS

Yunpeng C., et al., "Two-stage Merging Method Based on Log Structure Merging Tree," IP.com, 2017, pp. 1-10.

Galakatos A., et al., "FITing-Tree: A Data-Aware Index Structure," Mar. 2020, pp. 1-18.

Gohad T., et al., "Rethinking Ceph Architecture for Disaggregation Using NVMe-over-Fabrics", Sep. 2018, Cited on the Internet at: https://www.snia.org/educational-library/rethinking-ceph-architecture-disaggregation-using-nvme-over-fabrics-2018, pp. 1-3.

Gui., "New Insights into X-Engine: The New Storage Engine of RDS of MySQL," 2020, pp. 1-13.

Hazelcast., "What is a Key-Value Store?", 2021, cited on the Internet at: https://hazelcast.com/glossary/key-value-store/, pp. 1-7.

Idreos S., et al., "Learning Key-Value Store Design," Harvard University, 2019, pp. 1-27.

Mulford J., "What is NVMe-oF?" Jul. 2020, Storage Review, cited on the internet at: https://www.storagereview.com/review/nvme-nvme-of-background-overview#:~:text=NVMe%20is%20a%20specification%20thatpresenting%20new%20and%20better%20capabilities. pp. 1-10.

"NetApp SolidFire Plug-in for vRealize Orchestrator User Guide", Sep. 2018, Version 1.5, cited on the Internet at: https://library.netapp.com/ecm/ecm_download_file/ECMLP2838415, pp. 1-168.

Pollack D., "A Low Latency Scalable Key-Value Store from Modern off the Shelf Components," Sep. 2020, The Storage Networking Industry Association, Educational Library, cited on the Internet at: https://www.snia.org/educational-library/low-latency-and-scalable-key-value-store-modern-shelf-components-2020, pp. 1-3.

Raj., et al., "How to Calculate Time Complexity of a Randomized Search Algorithm," 2019, 2 pages.

Roy T., "System Design: Distributed Database System Key-Value Store", Jul. 2018, YouTube, Coding Made Simple, cited on the Internet at: https://www.youtube.com/watch?v=rnZmdmIR-2M, pp. 1-11.

"What is a Key-Value Database?", 2021, Amazon DynamoDB, cited on the Internet at: https://aws.amazon.com/nosql/key-value/, pp. 1-5.

Final Office Action mailed Nov. 3, 2022 for U.S. Appl. No. 17/234,894, filed Apr. 20, 2021, 64 pages.

Non-Final Office Action mailed Apr. 14, 2022 for U.S. Appl. No. 17/234,894, filed Apr. 20, 2021, 46 pages.

Non-Final Office Action mailed on Feb. 1, 2023 for U.S. Appl. No. 17/234,894, filed Apr. 20, 2021, 40 pages.

Notice of Allowance mailed on Jun. 20, 2023 for U.S. Appl. No. 17/234,894, filed Apr. 20, 2021, 08 pages.

* cited by examiner

KEY-VALUE STORE AND FILE SYSTEM INTEGRATION

RELATED APPLICATIONS

This application claims priority to and is a continuation of U.S. Patent Applications, titled "KEY-VALUE STORE AND FILE SYSTEM INTEGRATION", filed on Apr. 20, 2021 and accorded application Ser. No. 17/234,894, which is incorporated herein by reference.

BACKGROUND

A key-value store associates keys with value data items as key-value pairs. A key may comprise a filename, a hash value, a string, or any other information. A value data item may correspond to any type of data or content, such as an image, a file, a data block of data, or any other type of value data item. Key-value pairs of the key-value store are stored, retrieved, and updated using various commands, such as get commands, put commands, and delete commands. The key-value store can be used for a variety of use cases, such as session management at a high scale, user preference and user profile storage, content recommendation storage, a cache for frequently accessed but rarely updated data, etc.

DETAILED DESCRIPTION

Figure 1:
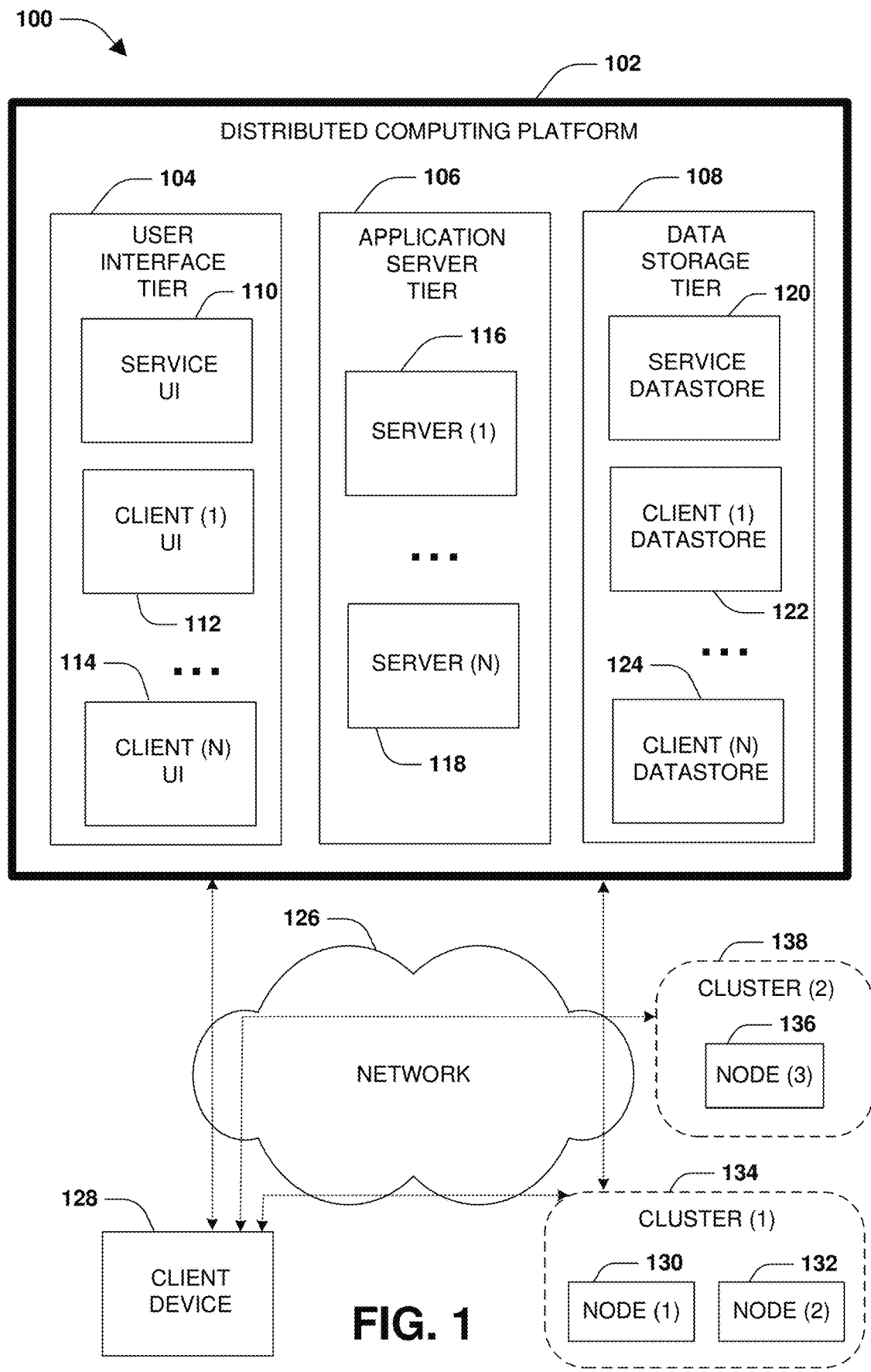
FIG. 1 is a block diagram illustrating an example computing environment in which an embodiment of the invention may be implemented.

The techniques described herein are directed to key-value store and file system integration. Conventional key-value stores are implemented external to a file system, and thus are unable to natively benefit from data management functionality (e.g., tiering, snapshot and backup functionality, restore functionality, compression, etc.), resiliency (e.g., data integrity checking functionality), and other storage management functionality and features provided by the file system. These conventional key-value stores may store key-value pairs together within an append log in a log structured merge tree of the key-value store. As the append log becomes full, the key-value pairs are merged (compacted) into a lower layer of the log structured merge tree for storage according to a sorted string table format in a sorted fashion.

Unfortunately, the key-value pairs being merged into a lower layer causes write amplification because both a key and a value data item of a key-value pair are rewritten. This results in overwriting an amount of data corresponding to both a key size of the key and a data size of the value data item such as a 4 kb data size. As the key-value pairs are merged down through a depth of the log structured merge tree, significant write amplification occurs because the key-value pairs are rewritten every time the key-value pairs are merged. Even when the key-value pairs are located at the lowest level of the log structured merge tree, sorting of the key-value pairs during subsequent merge operations will still continue to result in write amplification.

Furthermore, the keys may correspond to random cryptographic content hashes of the value data items. Because of this randomness, a key-value store implementing certain data structures, such as a B+ tree, to store the key-value pairs will also update a metadata block for each key insert. The lack of spatial locality in the key insert process causes a different metadata block (e.g., an indirect block) for every new key being inserted, which can cause double write amplification in the key insert process. Write amplification, where the amount of physically written data to a storage device is a multiple of the logical amount of data intended to be stored, results in reduced write performance, increased latency, increased storage bandwidth utilization, and reduced lifespan of the storage device.

In addition to write amplification issues, conventional key-value stores have other inefficiencies. These conventional key-value stores are used to store and retrieve arbitrary keys that are treated as monolithic blocks. Any logical separation of groups of keys must be handled by an end user. The user must build the logical separation into a key by partitioning the key using submasks, which results in numerous inefficiencies. For example, subspace management by a user leads to user side complexities, along with having to implement key masked wrapper APIs needed to handle application to storage mappings corresponding to where keys and value data items of an application are stored. There are also difficulties in creating snapshots (e.g., how to have different snapshot schedules for different applications), performing data management operations, setting up remote replication solutions that include tiering on a subspace basis (e.g., how to tier to cloud), and setting up storage service level polices per subspace (e.g., how to handle situations where one application is to have higher performance than another).

In contrast, various embodiments of the present technology provide for key-value store and file system to address the inefficiencies and disadvantages of conventional key-value stores. A key-value store is provided that stores keys separate from value data items in order to reduce write amplification. This key-value store is integrated into a file system in order to natively leverage data management functionality, data integrity checking functionality, and other storage management functionality and features of the file system. In particular, the key-value store is designed to minimize write amplification and read amplification of keys that may be randomly generated from content hashes of value data items. The key-value store is also designed to reduce a memory footprint of data loaded into memory, reduce a number of disk accesses, reduce CPU cycles consumed when a store operation is accessing an append log and a sorted log of the key-value store, ease of creating snapshots, tiering on a subspace basis, etc.

Because the key-value store is integrated into a file system of a node, data integrity checking of the file system can be leveraged to ensure resiliency of the key-value store. For example, atomic updates, context checking, consistency checks, and/or other functionality of the file system may be used to ensure data integrity and/or resolve data loss issues. In this way, the key-value store can provide additional resiliency guarantees compared to conventional key-value stores.

Keys and value data items are stored separate from one another such as where a key and a corresponding value data item are stored in data blocks that are not adjacent to each other. This reduces write amplification compared to conventional key-value stores that store the key and the corresponding value data item together such as in adjacent data blocks. In particular, a key points to a file system virtual volume block number and physical volume block number (vvbn/pvbn) combo. The vvbn/pvbn combo points to the actual value data item that is stored separate from the key. For example, the actual data can be stored in a separate file system file from the key. Thus, when a merge (compaction) operation is performed (e.g., from an append log down through one or more levels of sorted logs in a log structured merge tree of the key-value store), only the key and vvbn/pvbn combo is overwritten, and not the entire value data item. For example, the vvbn/pvbn combo may be 12 bytes and the entire value data item is a 4 kb block of data, and thus merely the 12 bytes of the vvbn/pvbn and a key size of the key is overwritten. In this way, a much smaller amount of data is being overwritten than how conventional key-value stores would overwrite the entire 4 kb block of data and the key size of the key. This reduces write amplification for the log structured merge tree because the value data item is not also being overwritten.

Furthermore, the value data item can be written to a separate file system file that can be compacted (e.g., implementation of bin packing by the file system) and/or compressed using a particular compression algorithm of the file system, thus leveraging storage efficiency functionality of the file system within which the key-value store is integrated. Also, because the implementation of the log structured merge tree is augmented with file system metadata indirection (e.g., utilization of indirect blocks of a buftree representing a file as direct block comprising data of the file and indirect blocks comprising pointers to other blocks) and file system storage efficiency of the file system, the key-value store is more efficient in terms of write amplification. This benefits solid state drives and flash storage that may have a finite write cycle limitation. Also, write operations are much faster (e.g., in terms of response time back to a client) because the write operations can be merely written to an NVRAM associated with the file system before a response can be provided back to a client, as opposed to additionally having to write the data to a storage device that has much higher latency than the NVRAM.

In some embodiments, a random distribution search is implemented for the key-value store. Conventional search operations of a sorted log of a convention key-value store usually use a binary search, which as a O(log N) cost. The key-value store, provided herein, is used to store keys generated from a content hash. The content hash provides a set of keys that are uniformly distributed in a keyspace. If a sorted log of the key-value store comprises keys that are uniformly distributed, then this random distribution search can identify the location of a key utilizing a formula: (key*log size of the sorted log)/(keyspace size of the keyspace). With this optimization, the location of the key within the sorted log may be identified much faster, such as in O(1). This reduces CPU cycles used by the search since merely a single block is accessed and a single cache line is polluted. Otherwise, performing the binary search would result in loading log N blocks and a comparison of keys in these blocks would hit multiple cache lines and can pollute the cache lines, thus costing more CPU cycles. This technique also reduces a memory footprint used because merely a single block is loaded into memory if the block is not already in memory, whereas the binary search might load more than one block into memory since the binary search is accessing different locations in the sorted log.

In some embodiments, key splitting may be implemented in order to reduce a lookup cost to identify a particular key. In an example, the keys within the key-value store may have a relatively equal distribution, and thus less than an entire key could be used to determine if the key is in a sorted log of a log structured merged tree of the key-value store. If the keys are equally distributed in the keyspace, then merely a portion of the key may be stored. The portion that is stored may correspond to a number of bytes of the key proportional to an actual data size of the sorted log. For example, a key may comprise 100 bytes, and there are 256 keys stored in the sorted log and the keys are equally distributed. Thus, merely a first byte of the key (e.g., a prefix of the key) may be stored in the sorted log. In a scenario where there is not a perfect equal distribution of keys in the keyspace, collisions can occur. This can be detected by looking at a key or portion thereof before or after the instant key portion to see if the two key portions are the same since the sorted log is sorted and thus key portions that are the same would be sorted next to one another. To resolve the collision, the remaining portion of the key may be stored in a secondary log that can be looked up on an as need basis. Even so, since merely the primary sorted log is loaded into memory with the sorted prefixes of the keys, the memory cost during a read is reduced because the entirety of all the keys (e.g., the remaining portions of the keys within the secondary log) are not loaded into memory.

In some embodiments, a starting key of a block is stored within an indirect (e.g., an indirect block of the file system) in order to reduce cost. For example, keys of the key-value store may be stored within a level 1 of a buftree (e.g., L1 indirect blocks of an L1 buffer) of the file system. The file system may already have higher levels loaded into memory, which can be used to help reduce lookup cost. In particular, the first key in every L1 indirect block may be stored within a level 2 of the buftree (e.g., L2 indirect blocks of an L2 buffer). This provides a way to traverse the buftree to reach a particular key in the sorted log. This also enables the ability to cross verify key content in a level 0 of the buftree (e.g., L0 direct blocks of an L0 buffer) by looking the L2 buffer.

In some embodiments, a pageable bloom filter is implemented for the key-value store. The pageable bloom filter may correspond to individual bloom filter chunks per level of a log structured merge tree of the key-value store. A bloom filter chunk of a level may be used to determine if a key exists in that level of the log structured merge tree. Because the key-value store may be split into multiple log structured merge trees and/or multiple keyspaces, there could be come keyspaces and/or log structured merge trees that are inactive due to client behavior. Utilizing the pageable bloom filter with bloom filter chunks per level avoids having to store the entire pageable bloom filter in memory, thus reducing a memory footprint of the key-value store. The pageable bloom filter helps to bring a single bloom filter chunk into memory when a specific keyspace and/or log structured merge tree starts to see client access traffic. Also, all hashes for a key will be in a same bloom block, which helps reduce read amplification since merely a single block is read even if the block is not in memory.

In some embodiments, atomic prefix based deletes may be implemented for the key-value store. For example, the key-value store is configured to enable deletes based on prefixes. This is achieved by logging a prefix of a key to delete into a delete log. Since sorted logs are sorted by key and the number of levels within a log structured merge tree of the key-value store is fixed (e.g., a max of 3 levels), a block index can be traversed to subtract, in constant time, a space that is to be deleted. This enables the ability to get back the space, and allows a user to start using that space even before the space has been freed up completely. As a background operation, the vvbns and pvbns in a sorted log associated with value data items being deleted can be punched out to free up the space without changing properties of the sorted log. This is possible since punching out the vvbns and pvbns is merely converting an entry from pointing to the value data item to pointing to a delete marker.

In some embodiments, context checking, such as data integrity checking, associated with key data may be implemented. Because the key-value store is integrated into the file system such as by using the level 1 (e.g., L1 indirect blocks of the L1 buffer) as a sorted log and an append log, data written to a storage device (e.g., value data items written to disk) has a context associated with the data. Upon a read of the data, the context is verified to ensure that consistency of the data is protected. Every write has a context containing a unique tree identifier and a location of the block being written to in the file system. If there is a lost write (e.g., a not fully completed write) and read data retrieves a different value data item, this is can be detected so that the wrong data is not returned to a requesting client.

In some embodiments, value data items can be moved between different storage devices and/or different storage providers, and defragmentation can be performed (e.g., moving data around within a storage device) without changing a sorted log and without disturbing key-value store operations. The sorted log of the key-value store is built using the L1 indirect blocks of the file system, and the keys such as pvbn and vvbn combinations are stored within the L1 indirect blocks. A pvbn may be a cached physical location of a block comprising a value data item. A vvbn may be a logical location of the block comprising the value data item. This configuration provides the ability to move a block's physical location (e.g., move a block between different storage devices, between different storage providers, between different blocks within a storage device due to defragmentation, etc.) without updating the sorted log. Since the context is stored along with the block, a read can detect a context mismatch if a physical block location has changed, and thus the read can redirect to a correct physical block by looking up a logical to physical mapping.

In some embodiments, metadata can be stored as part of the key-value store because the key-value store is integrated within the file system. If a same key was logged with different metadata, then the metadata can be merged. This helps with changing attributes associated with the key without modifying a frozen copy of a sorted log. This reduces write amplification and helps merge flags or attributes associated with the key.

In some embodiments, a range get iterator may be implemented to perform get operations, such as a get operation to list keys by prefix. For example, an O(n) walk may be performed to return all keys from when a range iteration by the range get iterator started, even across iterations. This is implemented as an ordering invariant for a log structured merge tree walk. Because the log structured merge trees are deterministically split based on prefix, only a single log structured merge tree is walked for a particular prefix key. The range get iterator walks an append log, which is not sorted, and keeps track of the position within the append log index and position in the append log. A consistency point (CP) count of the append log can be used to determine if there is an append log generated after the range get iterator started.

In an example, a depth of the log structured merge tree is constrained to a threshold number of levels, such as a maximum of 3 sorted log levels so that no more than 3 blocks would be maintained in memory at the same time during a traversal of the sorted logs. For example, 3 sorted logs may be traversed at the same time, and a smallest value may be picked from each sorted log, and a value from a smallest level log is picked as part of performing a get operation by the range get iterator. If the smallest level log has a delete marker, then the corresponding key is skipped. The append log can also be evaluated to see if there is a delete marker, and thus the corresponding key should be skipped.

In some embodiments, keyspaces are defined for the key-value store. The keyspaces provide a logical separation of keys on a per-user or per-application basis, such as where a keyspace is used to group keys assigned to a particular user or application. A same key can be stored logically multiple times across different keyspaces to ensure that workflows across each of the keyspaces operate independently with respect to other keyspaces. The implementation of keyspaces is abstracted from clients in a manner that is efficient in terms of underlying storage cost and performance. This is achieved by creating the log structured merge tree within a set of volumes that share aggregate storage backed by separate unique storage devices. This provides an enhanced feature set for users with little administrative cost or overhead.

In some embodiments, logical data separation is provided for end users of the key-value store. By creating individual keyspaces that share the same underlying volumes/aggregates, a user merely interacts with a keyspace assigned to keys of the user without having to be involved in storage device assignment and/or key-value store administration. Keyspaces provide storage efficiency because keys may be deduplicated and shared. That is, because there can be multiple log structured merge trees within a volume, disk blocks of the volume can be shared and deduplicated even though there can be the same keys across different keyspaces. Simplified subspace management APIs are provided for the key-value store. For example, a caller (e.g., a client/user) interacts based upon keyspace identifiers, and workflows operate independently with respect to other keyspaces. Keyspaces also provide for easy data management. For example, since snapshots and other data management operations may operate on a volume or set of volumes within a particular keyspace, snapshots can be easily created on a per-keyspace basis, along with data restore operations without affecting other keyspaces.

Furthermore, performance service level commitment (SLC) policies can be implemented on a per subspace (keyspace) basis. Because volumes can use different quality of service (QoS) policies, various performance QoS limits can be applied on a per-keyspace basis. With a hybrid storage system, different backend storage devices can be used according to client needs on a per-keyspace basis (e.g., faster storage devices for clients that require relatively lower latency, and cheaper and slower storage devices for clients with low cost requirements). Also, remote replication and/or tiering capabilities can be setup on a subspace (keyspace) basis to another storage environment, such as to the cloud, a remote replication site that provides disaster recovery, etc. Multiple copies of a keyspace may be maintained at various computing environments for redundancy. In addition, statistics (e.g., storage usage, access patterns, access latencies, modifications over time, etc.) are tracked and provided on a per-keyspace basis in order to provide complete keyspace management and workflows.

In some embodiments, the size of log structured merge trees may be bounded to avoid unpredictable storage and retrieval of keys. If the log structured merge trees were unbounded, then key retrieval would become inefficient with respect to the amount of metadata that would need to be kept in memory. Also, bloom filters associated with the log structured merge trees can become larger with every level of the log structured merge trees, and will result in additional disk reads if additional metadata reads are needed to retrieve the actual data. Accordingly, as provided herein, the size of the log structured merge trees may be bounded/constrained.

A max depth (e.g., a max number of levels) that is efficient for a single log structured merge tree may be determined based upon a disk size, an amount of data that can fit on a node, and/or an amount of available memory. Using this information, a forest of log structured merge trees is created within each keyspace using a user-agnostic partitioning scheme to ensure that the depth of a single log structured merge tree does not exceed a limit of the node. This provides predictable and bounded log structured merge trees that make up a forest, and also helps keep the memory footprint constant since the number of levels and bloom filter chunks (e.g., a single bloom filter chunk per level) to maintain is known.

Also, read efficiencies are maintained since the highest layer of a mapping that maps bins to log structured merge trees is performed through an in-memory hash that is persisted efficiently in log structured merge tree metafiles. A bin may be a logical construct, such as a logical data bucket. A data block maps to a particular bin based on higher order bits of a content hash value. A bin is mapped to a given node, which is referred to as a bin mapping or assignment. Each bin has at least one replica bin for data redundancy. By using keyspaces to partition key and value data items, a bin mapping hash scales easily because new keyspaces are partitioned based on their own keyspace tree hash rather than flooding the bin mapping hash. That is, the bin mapping hash is not needed to absorb scale out because the extra layer of keyspace indirection is used.

In some embodiments, a key invariant is maintained such that every bin is uniformly filled with data, which can avoid log structured merge tree rebalancing. The key invariant can be enforced if users directly rely on a key-generation scheme that is data based (e.g., a Skein hash), otherwise, the key invariant can be enforced using a key-mapping table to ensure that user-facing keys are mapped to uniformly distributed keys generated by a hash such as a Skein hash.

In some embodiments, application isolation and application integration use cases are implemented. Some applications built on top of key-value stores may require logical and/or physical data isolation due to security reasons. This is problematic from a scalability standpoint if separate key-stores would have to be deployed on a per-application basis, which requires significant administrative overhead. Additionally, application workflows that involve creation, deletion, and/or failover can become inefficient if a large amount of data needs to be filtered through in order to be operated upon by a single application. Accordingly, as provided herein, keyspaces provide a scalable subspace that can be independently managed for creation, deletion, and failover workflows. Keyspace implementation is a thin layer based on hashing. For security related application isolation use cases, keyspaces can be created on separate aggregates with unique attached storage devices to provide physical and/or logical separation.

Various embodiments of the present technology provide for a wide range of technical effects, advantages, and/or improvements to computing systems and components. For example, various embodiments may include one or more of the following technical effects, advantages, and/or improvements: 1) implementation of a random distribution search for quickly locating keys within logs of a key-value store; 2) splitting keys into portions to reduce key lookup costs; 3) storing a starting key within an indirect block of a file system to reduce a lookup cost; 4) implementation of a pageable bloom filter where separate bloom filters chunks per level of a log structured merge tree can be individually loaded into memory to reduce a memory footprint; 5) the ability to perform atomic prefix based deletes; 6) performing context checking for data integrity checking so that incorrect data is not provided to client; 7) the ability to move data between storage devices and/or the ability to perform defragmentation without modifying a state of a sorted log and/or without disturbing key-value store operations; 8) performing metadata merging; 9) implementing a range get iterator; 10) implementing keyspaces for logical and/or physical separation so that data management functionality and policies can be applied on a per-keyspace basis; and 11) implementation of a key-value store in a manner that reduces write amplification, provides read optimization using a pageable bloom filter, and improves resiliency against data corruption or loss.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc., which may be part of a on-premise, cloud-based, or hybrid storage solution.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some embodiments, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
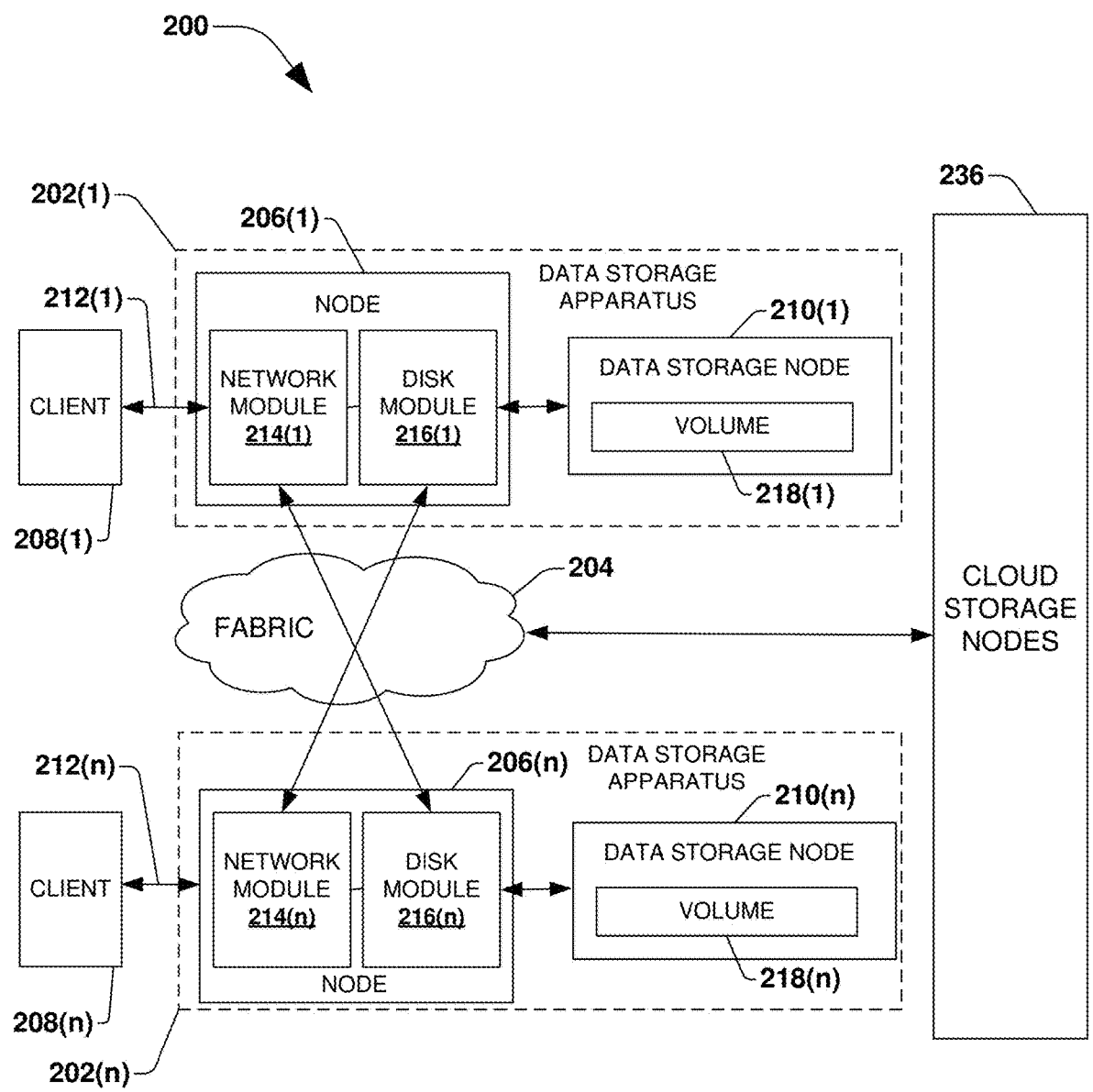
FIG. 2 is a block diagram illustrating an example of a network environment with exemplary nodes in accordance with an embodiment of the invention.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In this example, nodes 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The nodes 206(1)-206(n) may be implemented as hardware, software (e.g., a storage virtual machine), or combination thereof.

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an embodiment, the nodes 206(1) and 206(n) may be configured according to a disaster recovery configuration whereby a surviving node provides switchover access to the data storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the nodes 206(1)-206(n) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
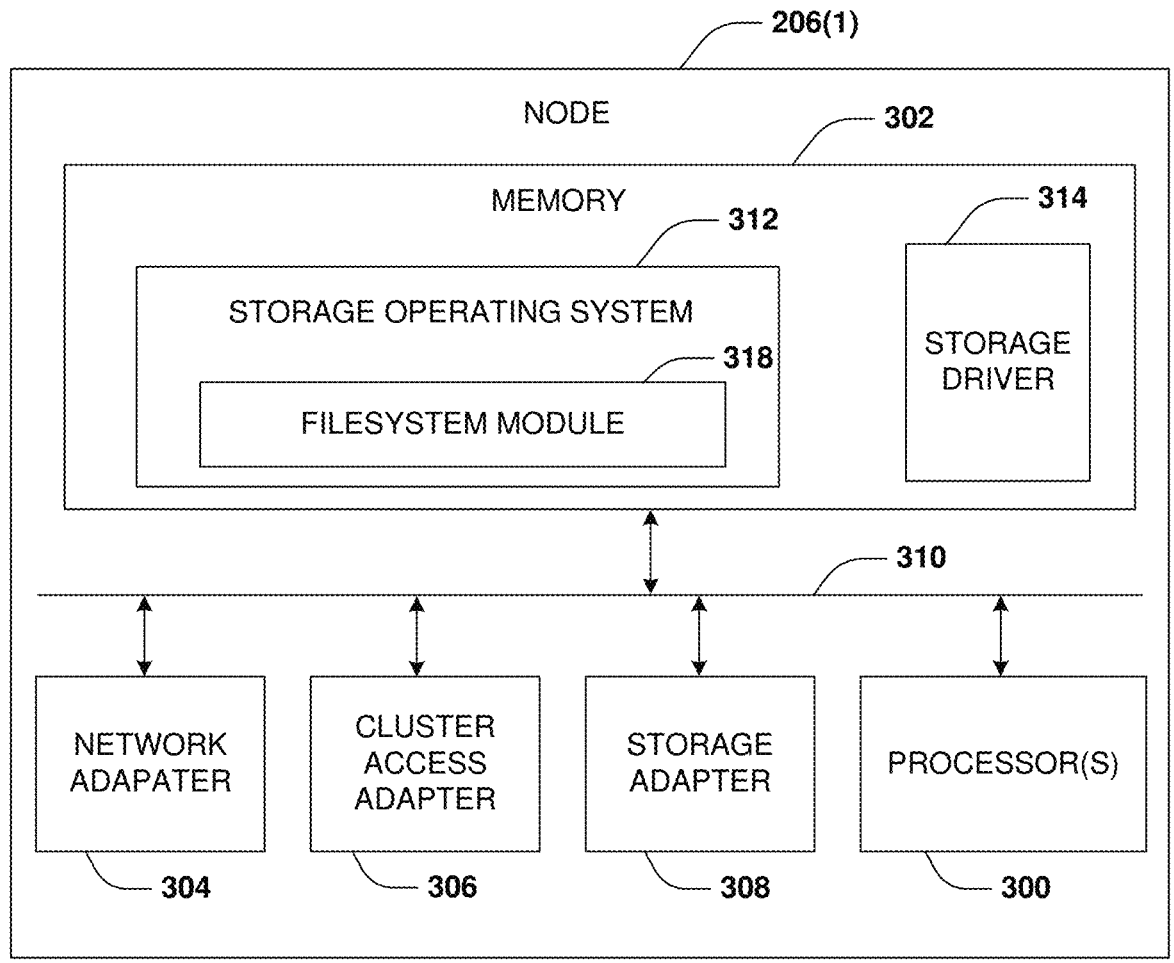
FIG. 3 is a block diagram illustrating an example of various components that may be present within a node that may be used in accordance with an embodiment of the invention.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g., a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
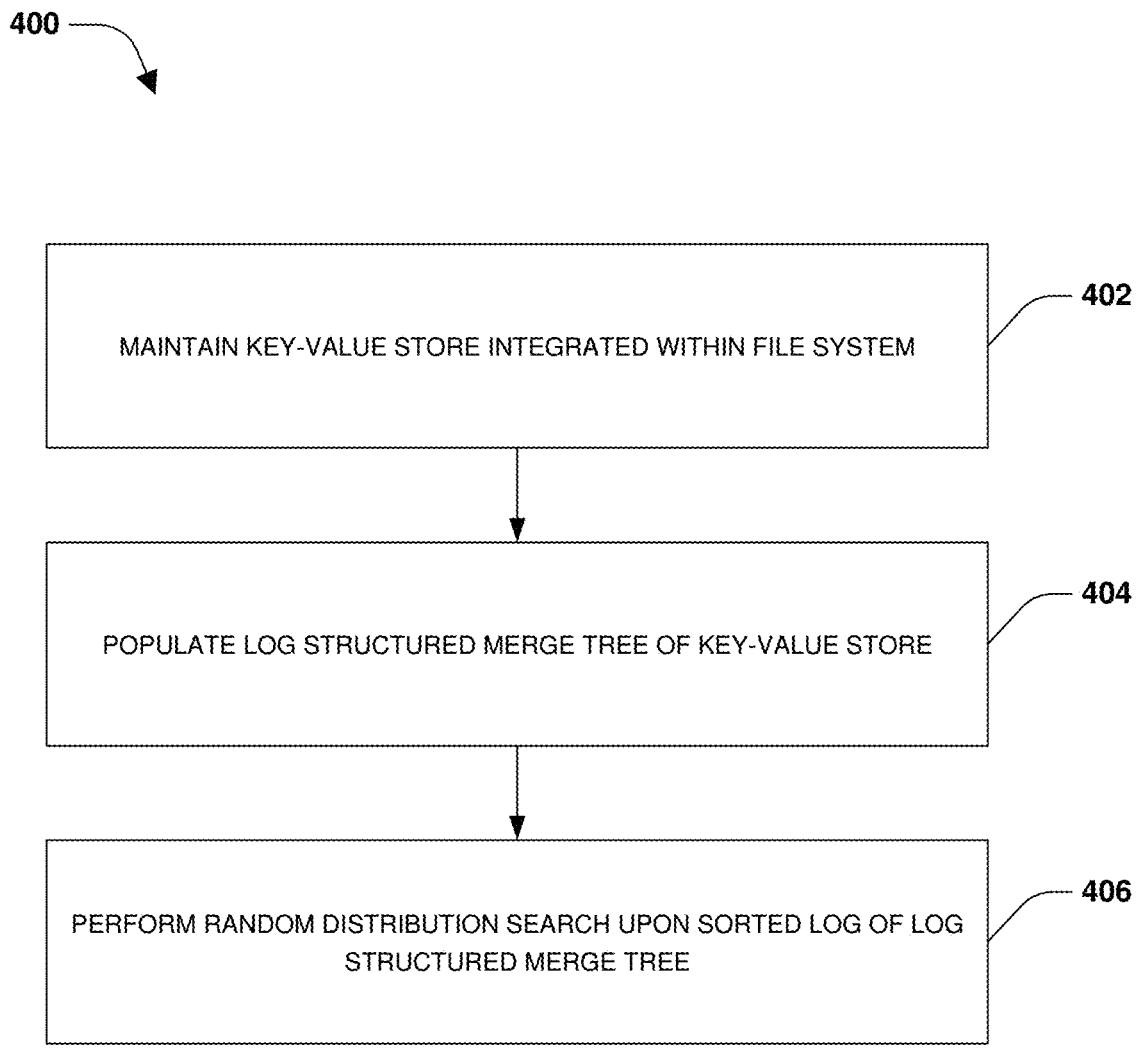
FIG. 4 is a flow chart illustrating an example of a set of operations that support key-value store and file system integration in accordance with an embodiment of the invention.
Figure 5:
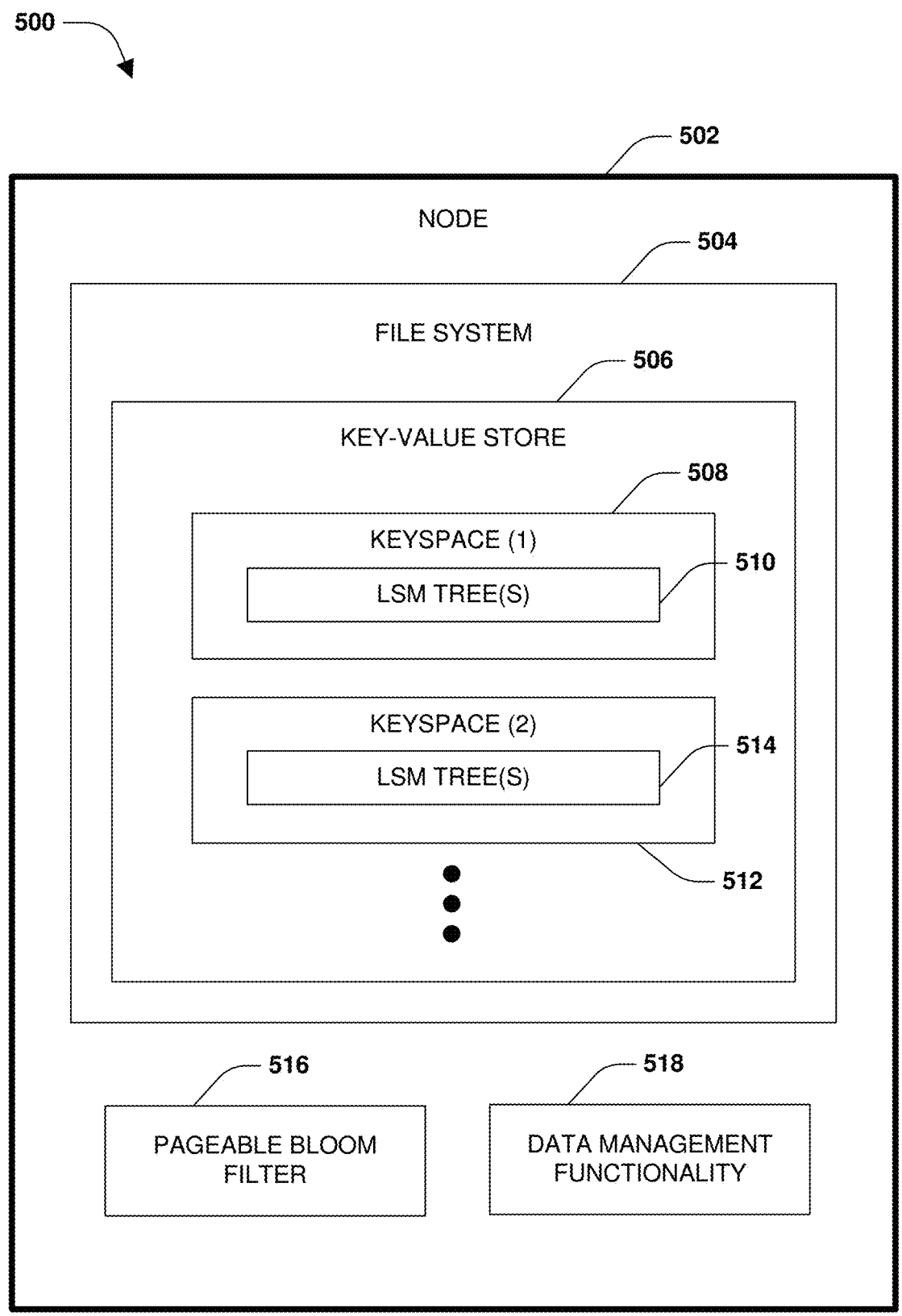
FIG. 5 is a block diagram illustrating an example of supporting key-value store and file system integration in accordance with an embodiment of the invention.

One embodiment of key-value store and file system integration is illustrated by an exemplary method 400 of FIG. 4 and further described in conjunction with system 500 of FIG. 5. A node 502 may comprise a computing device, a virtual machine, a server, a storage application or appliance, a cloud implemented service, hardware, software, or combination thereof. The node 502 may implement a file system 504 capable of providing robust data storage management, storage efficiency functionality, etc. A key-value store 506 may be natively integrated into the file system 504 such that native data management functionality 518 (e.g., backup, restore, snapshot, data integrity checking, and/or other functionality), APIs, and/or file system data structures (e.g., a buftree comprising levels of indirect blocks and a bottom level of direct blocks used to store value data items) may be leveraged by the key-value store 506. Accordingly, during operation 402 of method 400 of FIG. 4, the key-value store 506, integrated into the file system 504 of the node 502, may be maintained.

One or more keyspaces may be defined for the key-value store 506 in order to provide logical and/or physical separation, such as for different applications or clients accessing the node 502. For example, a first keyspace 508, a second keyspace 512, and/or other keyspaces may be defined for the key-value store 506. Keys within a single keyspace may be unique, but multiple instances of the same keys may be stored across multiple separate keyspaces, which allows for deduplication and/or sharing of data blocks storing the multiple instances of the same keys. This is because individual keyspaces may share the same underlying volumes and/or aggregates, in some embodiments. Also, keyspace level snapshot creation and restore functionality can be implemented on a per-keyspace basis, and performance service level commitment (SLC) policies can be implemented on a per-keyspace basis.

The key-value store 506 may be comprised of one or more log structured merge trees, such as a forest of log structured merge trees. Each keyspace may contain one or more log structured merge trees, such as where the first keyspace 508 comprises a first set of log structured merge trees 510, the second keyspace 512 comprises a second set of log structured merge tree 514, etc. A log structured merge tree may comprise a log structured merge info file, an append log hash, an append log where keys are stored until the append log is a threshold amount full, a lookup file comprising a block index and a bloom filter used to locate keys, and a sorted log into which keys are sorted from the append log when the append log becomes the threshold amount full. A key may point to a virtual volume block number and a physical volume block number of a value data item associated with the key. They key may comprise a content hash of the value data item. Accordingly, during operation 404 of method 400 of FIG. 4, a log structured merge tree of the key-value store 506 may be populated with the key corresponding to the content hash of the value data item that is stored separate from the key. For example, the key and the value data item are stored within different data blocks and are not stored within data blocks that are adjacent to one another. In some embodiments, the key is stored within an indirection level of a buftree of the file system (e.g., within an indirect block of a L1 or L2 buffer of the buftree). In some embodiments, the value data item is stored within a bottom level of the buftree (e.g., within a direct block of an L0 buffer of the buftree).

In some embodiments of storing the key, the key may be split into portions in order to reduce lookup time and cost. For example, a first portion of the key may be stored within the sorted log. The first portion of the key may be proportional to a log size of the log (e.g., a first byte of a 100 byte key may be stored as the first portion if the log size corresponds to 256 keys being stored within the sorted log). A second portion of the key (e.g., the remaining 99 bytes) may be stored within a secondary log. If a random distribution search of the sorted log encounters two instances of the first portion of the key, then a look up to the secondary log can be performed to identify the second portion of the key.

During operation 406 of method 400 of FIG. 4, a random distribution search may be performed upon the key-value store 506 to identify a key pointing to a physical volume block number and a logical volume block number of a data block comprising a value data item to which the key corresponds. The random distribution search may be performed upon a sorted log of a log structured merge tree in order to identify the key as being stored within the sorted log of the log structured merged tree. A starting location for the random distribution search within the sorted log may be derived from the key, a log size of the sorted log, and/or a keyspace size of a keyspace within which the key is stored (e.g., starting location=(key*log size)/(key space size)). The starting location may be identifiable because keys are derived from content hashes, and are thus uniformly distributed within the keyspace. In some embodiments where the keys within the value store 506 are random based upon the content hashes of the value data items, the random distribution search can be performed with an O(1) complexity for identifying a prediction location of the key within the sorted log as the starting location. Furthermore, merely a single block is loaded into memory for locating the key.

In some embodiments of implementing the random distribution search, keys may be assumed to be equally distributed within a keyspace due to the random nature of content hashes used to derive the keys. A bin is the first set of bytes in a key, such as a first 2 bytes in the key. All keys that belong to a bin (e.g., keys that have the same first 2 bytes), will end up in a same log structured merge tree. The number of bins that exist within a log structured merge tree is identifiable. A bitmap is created to store the bins that are part of the log structured merge tree, and a position of a bin within the log structured merge tree is identifiable once sorted. This information can be used to determine where a bin might start in a sorted log of the log structured merge tree. A bin length is calculated based upon (file size)/(bin count*block size). A bin start index is calculated based upon bin length multiplied by bin position. Alternatively, a position of a bin can be updated while building the sorted log as part of a merge operation. Having the bin start index and/or the position of the bin from the building of the sorted log helps to accurately pin point a location of keys in relation to where a particular bin starts in the log structured merge key.

Once the position of the bin within the sorted log is determined, a key index is calculated based upon the formula: key position in sorted log=bin start index+(bin length* (key−minimum block identifier in bin))/(max block identifier in bin—minimum block identifier in bin). In an example, a key may be 8 bytes, a bin count may be determined to be 10, a bin position may be determined to be 7, a file size may be 100 GB, a block size may be 4,096 bits, the key may be 0x4587947923B4923A49400423EC23F21 D, the bin may be 0x4587, the minimum block identifier in bin may be 0x45870000000000000000000000000000, and the maximum block identifier in bin may be 0x4587FFFFFFFFFFFFFFFFFFFFFFFFFFFF. Accordingly, using the formula: bin length=(file size)/(bin count*block size)=100 GB/(10*4096)=2,621,440 entries is determined as the bin length. Using the formula: bin start index=bin length*bin position=2,621,440*7=18,350,080 start index is determined as the bin start index. Using the formula: key position in sorted log=bin start index+(bin length*(key−minimum block identifier in bin))/(max block identifier in bin—minimum block identifier in bin)=18,350, 080+((2,621,440*0x947923B4923A49400423EC23F21D)/ 0xFFFFFFFFFFFFFFFFFFFFFFFFFFFFFFFF F) is determined as a file block number (key position in sorted log) in the sorted where the key may be located (e.g., the starting location for searching for the key). In addition, a lookup can be performed in a bloom filter chunk of a pageable bloom filter and/or a block index to confirm the file block number before directly searching in the sorted log starting at the file block number.

In some embodiments, a pageable bloom filter 516 having bloom filter chunks per level of a buftree used to store the key-value store 506 may be maintained. A bloom filter chunk of a particular level within the buftree may be loaded into memory and used to determine whether the key is located within that level. The pageable bloom filter is split into the multiple bloom filter chunks in order to reduce write amplification and so that merely a single bloom filter chunk is loaded into memory while performing the random distribution search, such as randomized lookup, to the key-value store 506.

In some embodiments, at least one of the virtual volume block number or the physical volume block number pointed to by the key are used to implement a read operation to read the value data item. As part of implementing the read operation, a context associated with the value data item may be verified. The context may comprise a tree identifier and/or a location of the value data item within the file system 504. The context may be verified utilizing a data integrity checker of the file system 504. In some embodiments, the context is verified using a content hash stored within an indirect block (e.g., a content hash of the key stored within an indirect block of a buftree corresponding to the tree identifier).

In some embodiments, a prefix based delete may be performed for the key-value store 506. The prefix based delete may be performed to delete a portion of the sorted log between a first prefix and a second prefix (e.g., delete a pace between a first prefix of a first key or value data item and a second prefix of a second key or value data item). The space between the first prefix and the second prefix may be identified, and may be taken back for other purposes (e.g., to store other data of a client) before the space is completely deleted and freed.

Figure 6:
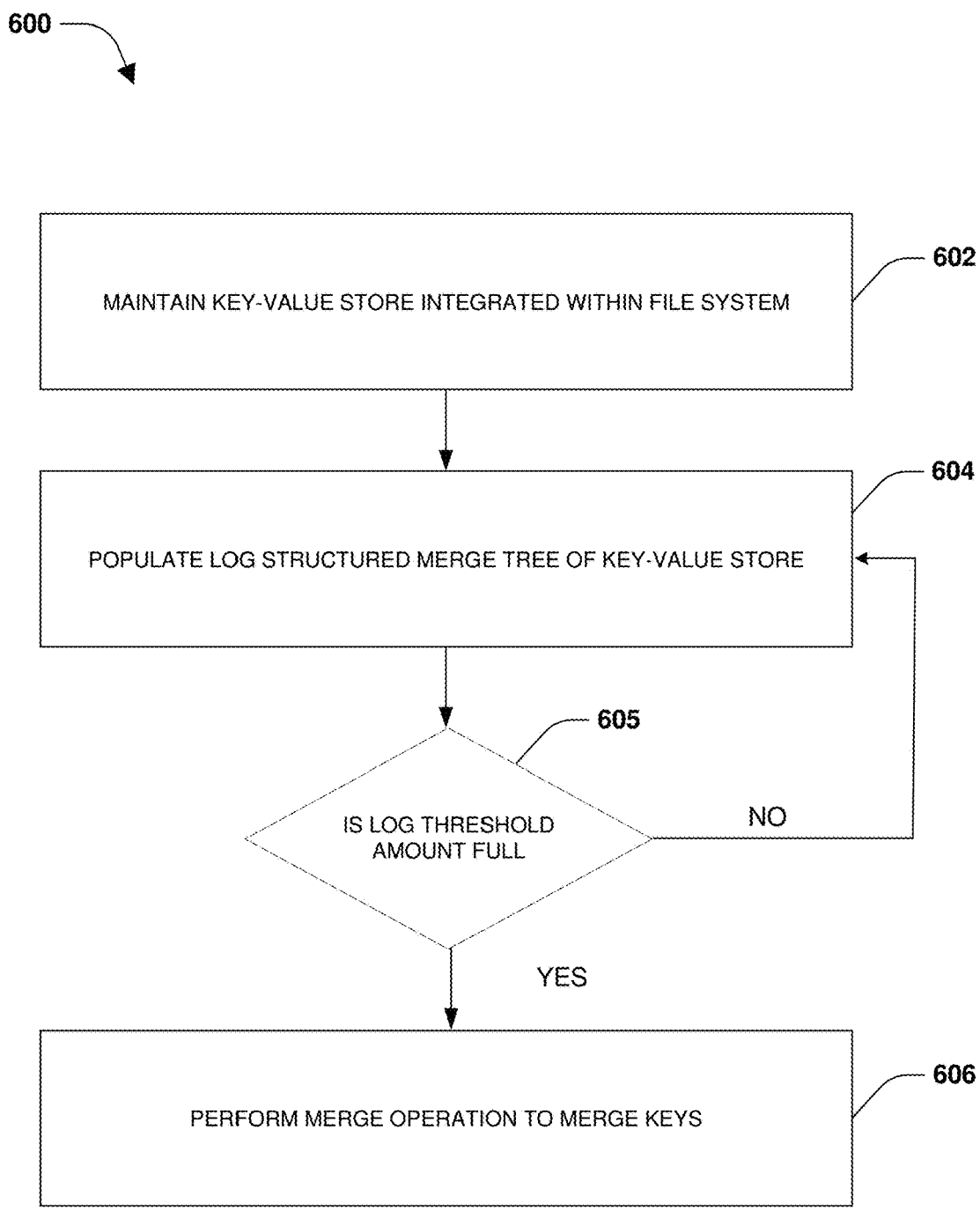
FIG. 6 is a flow chart illustrating an example of a set of operations that support key-value store and file system integration in accordance with an embodiment of the invention.
Figure 7:
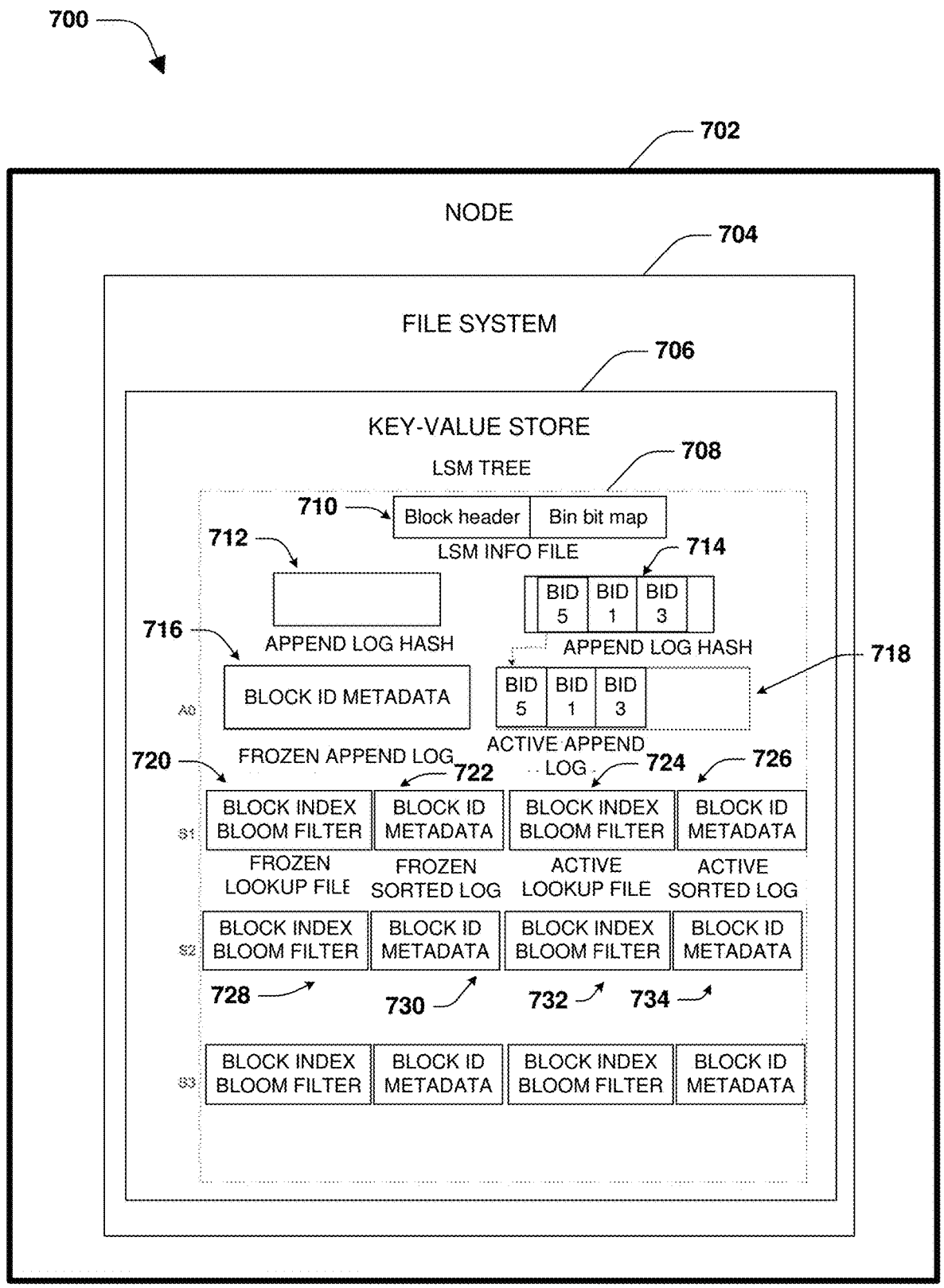
FIG. 7 is a block diagram illustrating an example of supporting key-value store and file system integration in accordance with an embodiment of the invention.

One embodiment of key-value store and file system integration is illustrated by an exemplary method 600 of FIG. 6 and further described in conjunction with system 700 of FIG. 7. A node 702 may implement a file system 704 capable of providing robust data storage management, storage efficiency functionality, etc. A key-value store 706 may be integrated into the file system 704 such that native data management functionality (e.g., backup, restore, snapshot, data integrity checking, and/or other functionality), APIs, and/or file system data structures (e.g., a buftree comprising levels of indirect blocks and a bottom level of direct blocks of value data items) may be leveraged by the key-value store 706. Accordingly, during operation 602 of method 600 of FIG. 6, the key-value store 706, integrated into the file system 704 of the node 702, may be maintained. During operation 604 of method 600 of FIG. 6, a log structured merge tree 708 of the key-value store 706, may be populated with a key corresponding to a content hash of a value data item stored separate from the key. In some embodiments, a number of levels of the log structured merge tree 708 may be constrained to a threshold number of levels (e.g., a maximum of 3 levels or any other number of levels). The threshold number of levels may be derived from a search optimization metric (e.g., a number of levels that reduces a search time and complexity for locating a key within the log structured merge tree 708), a bloom filter lookup cost metric (e.g., a number of levels that reduces a lookup cost using a bloom filter chunk to determine whether a key is located within a level of the log structured merge tree 708), and/or a memory consumption metric for reducing a number of blocks loaded into memory during a search operation.

The log structured merge tree 708 may comprise a log structured merge tree info file 710 comprising a header block and a bin bit map. The log structured merge tree info file 710 may be a root block of the log structured merge tree 708 used to traverse down through the log structured merge tree 708. The log structured merge tree 708 may comprise one or more append log hashes, such as an append log hash 712 and an append log hash 714. The log structured merge tree 708 comprises one or more append logs, such as a frozen append log 716 (e.g., an append log that has been frozen during a merge operation), an active append log 718, etc. Keys, such as block identifier metadata of virtual volume block numbers and physical volume block numbers corresponding to locations of value data items, are initially put into the append log hash 714, and are then inserted into the active append log 718. As the active append log 718 becomes full, keys are merged down into sorted logs of the log structured merge tree 708 in a sorted manner. The log structured merge tree 708 may comprise one or more levels, such as a level S1, a level S2, and a level S2. Each level may comprise lookup files and/or sorted logs. For example, the level S1 comprises a frozen lookup file 720, a frozen sorted log 722, an active lookup file 724, and an active sorted log 726. The level S2 may comprise a frozen lookup file 728, a frozen sorted log 730, an active lookup file 732, and an active sorted log 734. Each lookup file may comprise a block index and a bloom filter used to locate sorted keys within the sorted logs.

As a sorted log becomes full, a merge operation may be performed. During operation 605 of method 600 of FIG. 6, a determination may be made as to whether a log (e.g., a sorted log of the log structure merge tree 708) is a threshold amount full. If the log is not a threshold amount full, then keys will continue to be inserted into the log. If the log is a threshold amount full, then, the merge operation is performed to merge keys of a sorted log of a level within the log structured merge tree 708 (e.g., active sorted log 726) with another sorted log of a lower level within the log structured merge tree 708 (e.g., active sorted log 734) during operation 606 of method 600 of FIG. 6. In some embodiments, merely the keys within the sorted log are merged, and the value data items associated with the keys are retained in an unmodified state (e.g., remain within the same data blocks) as part of the merge operation in order to reduce write amplification.

In some embodiments where multiple instances of the same key are stored across different keyspaces, metadata may be merged amongst the keys. For example, a first instance of a key may have first metadata. A second instance of the key may have second metadata. The first metadata and the second metadata may be merged while retaining a state of a frozen sorted log associated with the key.

In some embodiments, value data items (e.g., data blocks comprising the value data items) may be defragmented in order to improve storage efficiency. The value data items, tracked by the key-value store 706, may be defragmented while retaining states of the sorted logs within the log structured merge tree. That is, because the value data items are stored separate from the keys and the key-value store 706 is integrated into the file system 704, the value data items may be defragmented without modifying the keys. For example, a key can point to a virtual volume block number and physical volume block number of the file system 704, which can be updated to point to a new block location of a value data item after defragmentation without having to modify the key. Similarly, value data items can be compressed using a compression technique of the file system 704 and/or compacted using a file system compaction technique of the file system 704 in order to improve storage efficiency. The value data items can be compressed and/or compacted while retaining the states of the sorted logs within the log structured merge tree 708 because the key-value store 706 is integrated into the file system 704 and compression algorithms and/or compaction algorithms of the file system 704 can be leveraged.

In some embodiments, value data items may be migrated from one location to another location while retaining the states of the sorted logs within the log structured merge tree 708. In an example, a value data item may be migrated from one data block to another data block within a same storage device. In an example, the value data item may be moved from one storage device to a different storage device. In an example, the value data item may be moved from one storage provider (e.g., on-premise storage) to another storage provider (e.g., a cloud storage provider).

In some embodiments, data integrity checking functionality of the file system 704 may be implemented for the key-value store 706. In an example, a data integrity checking operation may determine that a key within the key-value store is corrupt. The data integrity checking operation may be executed by the file system 704 as part of a read operation to read the key of the key-value store 706. In response to the data integrity checking operation determining that the key is corrupt, the key may be recreated using a corresponding value data item stored in a data block separate from the key. For example, the key may be recreated from a content hash of the value data item. The data corruption of the key may not affect the value data item because the value data item is stored separate from the key.

Figure 8:
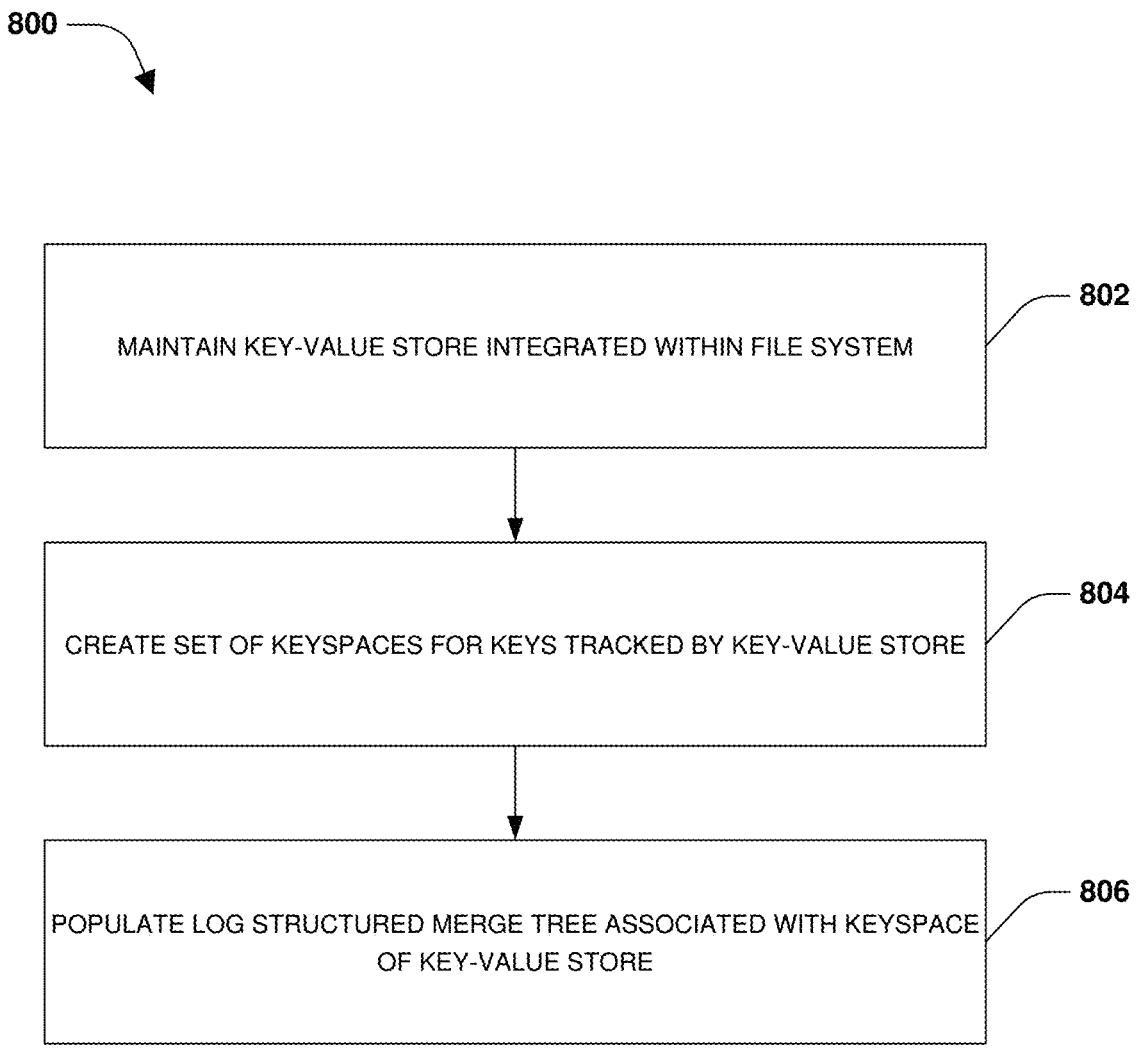
FIG. 8 is a flow chart illustrating an example of a set of operations that support key-value store and file system integration in accordance with an embodiment of the invention.
Figure 9:
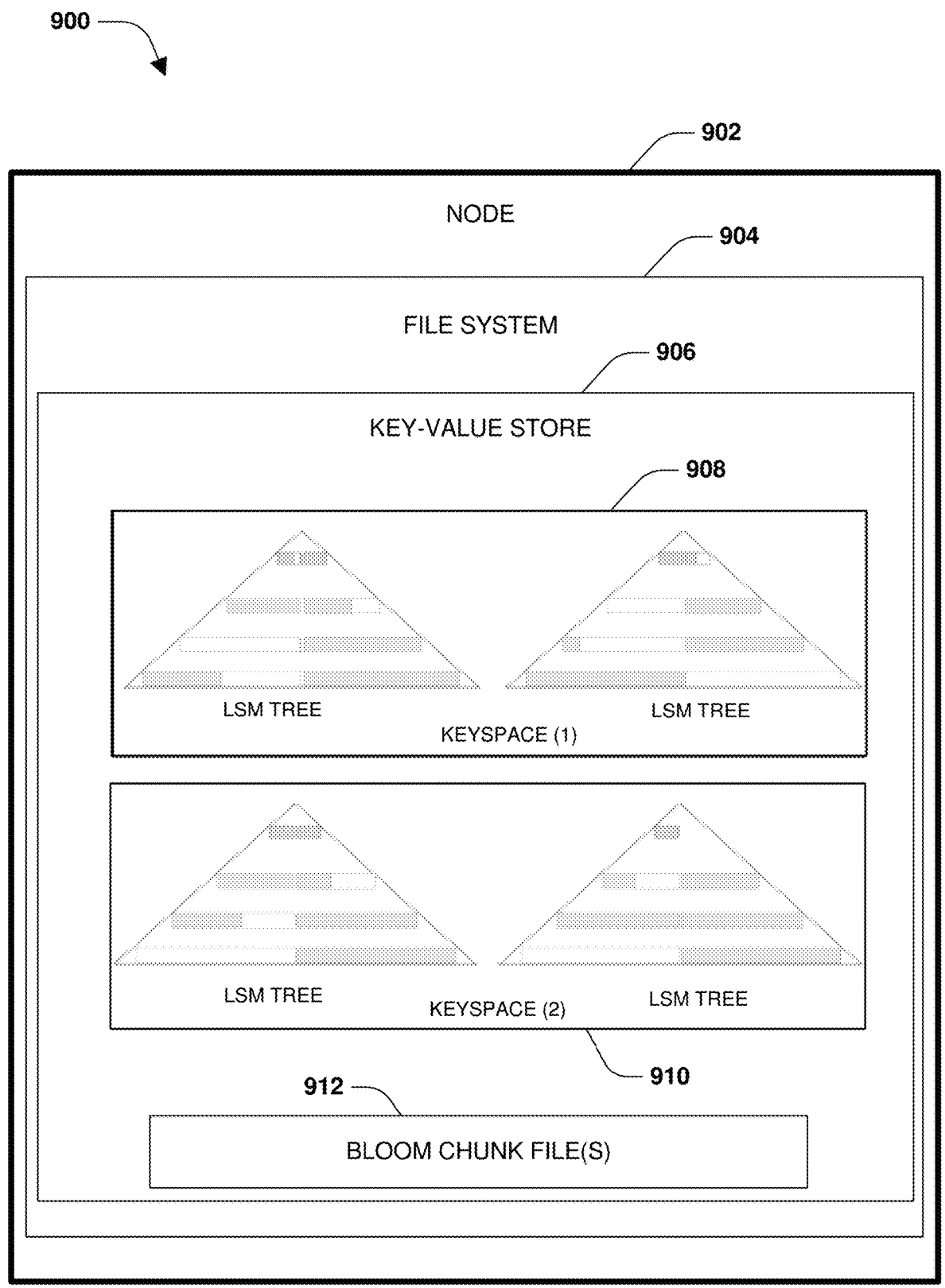
FIG. 9 is a block diagram illustrating an example of supporting key-value store and file system integration in accordance with an embodiment of the invention.

One embodiment of key-value store and file system integration is illustrated by an exemplary method 800 of FIG. 8 and further described in conjunction with system 900 of FIG. 9. A node 902 may implement a file system 904 capable of providing robust data storage management, storage efficiency functionality, etc. A key-value store 906 may be integrated into the file system 904 such that native data management functionality (e.g., backup, restore, snapshot, data integrity checking, and/or other functionality), APIs, and/or file system data structures (e.g., a buftree comprising levels of indirect blocks and a bottom level of direct blocks comprising value data items) may be leveraged by the key-value store 906. Accordingly, during operation 802 of method 800 of FIG. 8, the key-value store 906, integrated into the file system 904 of the node 902, may be maintained.

During operation 804 of method 800 of FIG. 8, a set of keyspaces, such as a first keyspace 908, a second keyspace 910, and/or other keyspaces, may be created for keys tracked by the key-value store 906. A keyspace may be constrained to storing no more than a single instance of a key. However, multiple instances of the key may be stored across multiple different keyspaces. In some embodiments, a keyspace may be defined to comprise a set of keys corresponding to a set of data value items that share a similar characteristic (e.g., data with similar access patterns, data having a similar data type, backup data as opposed to actively accessed data, data of a particular application, data of a particular user, etc.). In this way, the set of keys, corresponding to similar data value items, are grouped into a particular keyspace so that a data management policy (e.g., a tiering policy to tier backup data of the keyspace to cloud storage; a quality of service policy to implement; compression technique to execute; etc.) can be applied to the set of similar value data items. In some embodiment, keyspaces may be stored in separate aggregates in order to provide logical separation, such as to satisfy client security requirements. In some embodiment, keyspaces may be stored in separate storage devices in order to provide physical separation, such as to satisfy client security requirements.

During operation 806 of method 800 of FIG. 8, log structured merge trees, associated with the keyspaces, may be populated with keys corresponding to content hashes of value data items stored separate from the keys. In some embodiments, one or more bloom chunk files 912 may be associated with the key-value store 906. A bloom chunk file may be used to locate a block (e.g., a bloom block) that has a bloom filter for a particular key. The bloom chunk file may be utilized as an index file (e.g., a bloom filter chunk index file) for locating bloom filters for keys.

In some embodiments, data management operations may be performed upon the keyspaces on a per-keyspace basis. The data management operations may correspond to a snapshot operation (e.g., a snapshot of a particular keyspace), enforcement of a policy (e.g., a quality of service policy specifying a particular bandwidth, latency, or other guarantee for a client), execution of a selected compression technique (e.g., backup data value items corresponding to keys of a particular keyspace may be compressed with a stronger compression algorithm compared to actively accessed data value items corresponding to keys of a different keyspace), a tiering technique (e.g., backup data value items corresponding to keys of a particular keyspace may be tiered to cloud), etc.

Figure 10:
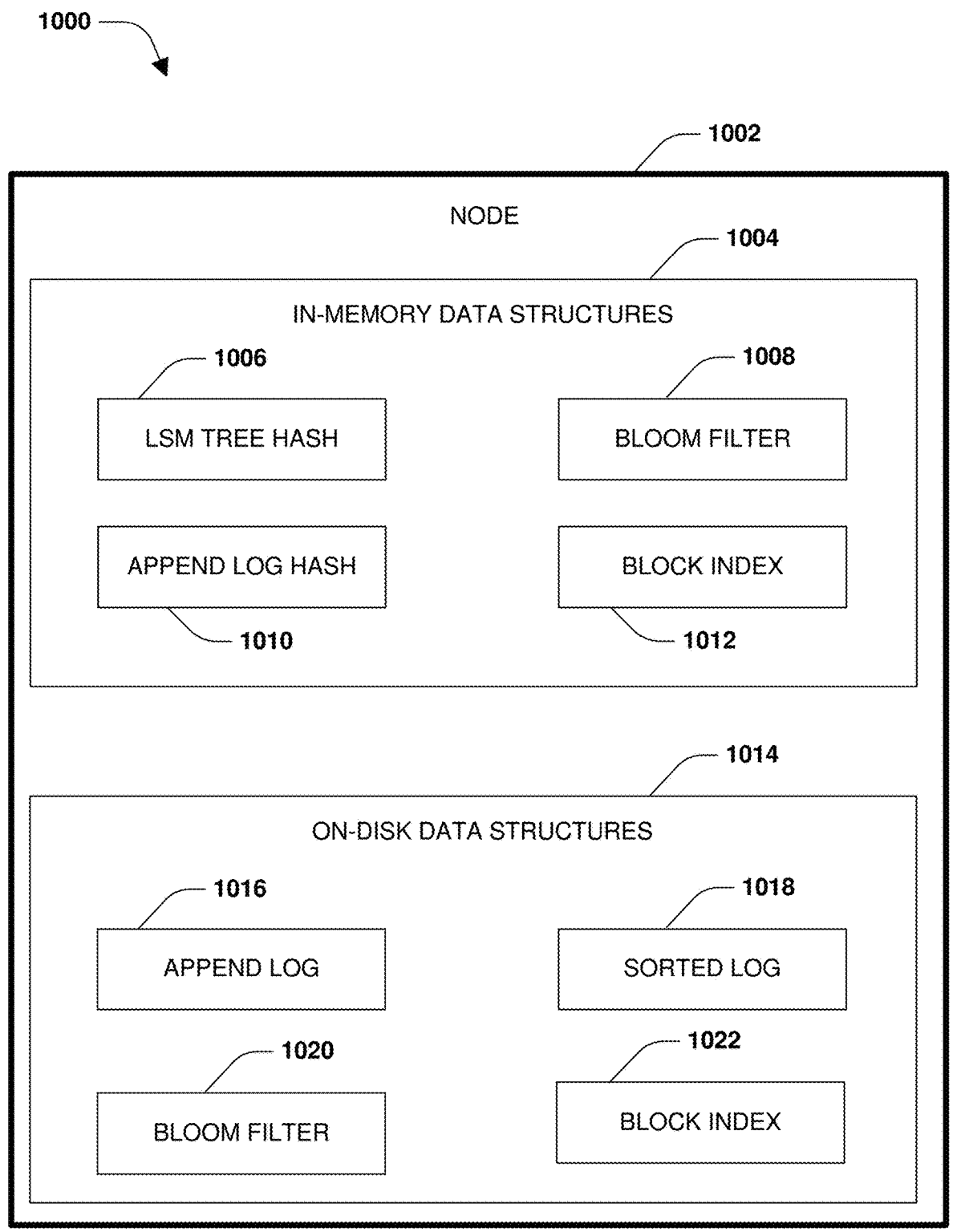
FIG. 10 is a block diagram illustrating an example of supporting key-value store and file system integration in accordance with an embodiment of the invention.

FIG. 10 is an illustration of a node 1002 implementing in-memory data structures 1004 and on-disk data structures 1014 of a key-value store integrated into a file system of the node 1002. A log structured merge tree hash 1006, a bloom filter 1008 (e.g., a bloom filter chunk of a pageable bloom filter), an append log hash 1010, and/or a block index 1012 may be maintained as the in-memory data structures 1004 for the key-value store. The log structured merge tree hash 1006 may be maintained per node. The log structured merge tree hash 1006 may map keys to volume identifiers of volumes and log structured merge tree identifiers of log structured merged trees in the volumes. The log structured merge tree hash 1006 may be created during a bin add operation or while adding a keyspace, and each bin identifier or keyspace identifier is stored within a header of an append log. There is an append log hash 1010 per append log. The append log hash 1010 may comprise keys corresponding to in-memory extents of value data items or to virtual volume block numbers and/or physical volume block numbers on disk of value data items. The append log hash 1010 is built in a write path where write operations are processed.

There is a bloom filter chunk 1008 per sorted log. The bloom filter chunk 1008 is used to check to see if a data block associated with a key is within a sorted log. The bloom filter chunk 1008 comprises block identifiers of data blocks within that sorted log. Block identifiers of valid entries and delete markers are added into the bloom filter chunk 1008. The bloom filter chunk 1008 may be built during a merge operation to a level within a log structured merge tree, and can be deleted after a subsequent merge operation to a next level within the log structured merge tree. Since the bloom filter chunk is persistent on disk, the bloom filter is pageable. There is a block index 1012 per sorted log. The block index 1012 is used to locate metadata file block number (fbn) locations on disk. The block index 1012 may correspond to a first key in a sorted log fbn. The block index 1012 is built during a merge operation to a level within the log structured merge tree. The block index 1012 can be deleted after a subsequent merge operation to a next level within the log structured merge tree.

An append log 1016, a sorted log 1018, a bloom filter 1020 (e.g., the pageable bloom filter), and/or a block index 1022 may be maintained as the on-disk data structures 1014. The append log 1016 and the sorted log 1018 may reside in a public inode space, which allows for deduplication. A sorted file such as the sorted log 1018 has a lookup file that has a bloom filter and block index for the sorted log 1018. The append log 1016 can be a frozen append log or an active append log that may be fronted by an in-memory hash. New writes are executed upon the active append log. When one append log reaches a threshold fullness and the other append log is empty, the append log that has reached the threshold fullness is frozen. An in-memory hash is created as part of an update to the active append log. Block identifiers (BIDs), metadata, virtual volume block numbers, and/or physical volume block numbers are stored in L1 indirect blocks of an append log 1016, and value data items are stored into L0 direct blocks of the append log 1016.

Read operations will look up an in-memory hash, where a key is a block identifier and a value is a file block number of an append log. Writes are executed upon the active append log, and are appended to an end of the active append log. Merge operations are performed on a frozen append log after an inode of the frozen append log is out of a consistency point and is not in the process of being flushed to disk. Waiting for the consistency point will obtain a virtual volume block number and/or physical volume block number in an L1 indirect block of an append log and user data in an L0 direct block of the append log. A frozen version and an active version of the sorted log and the lookup file may be maintained. Reads are executed upon a frozen version, and writes during a merge are directed to the active version. Block identifiers (BIDs), metadata, virtual volume block numbers, and/or physical volume block numbers are be stored in L1 indirect blocks of the sorted log 1018, and value data items are stored within L0 indirect blocks of the sorted log 1018. A merge operation merges frozen logs in level N and N+1 to an empty active log at N+1.

Figure 11:
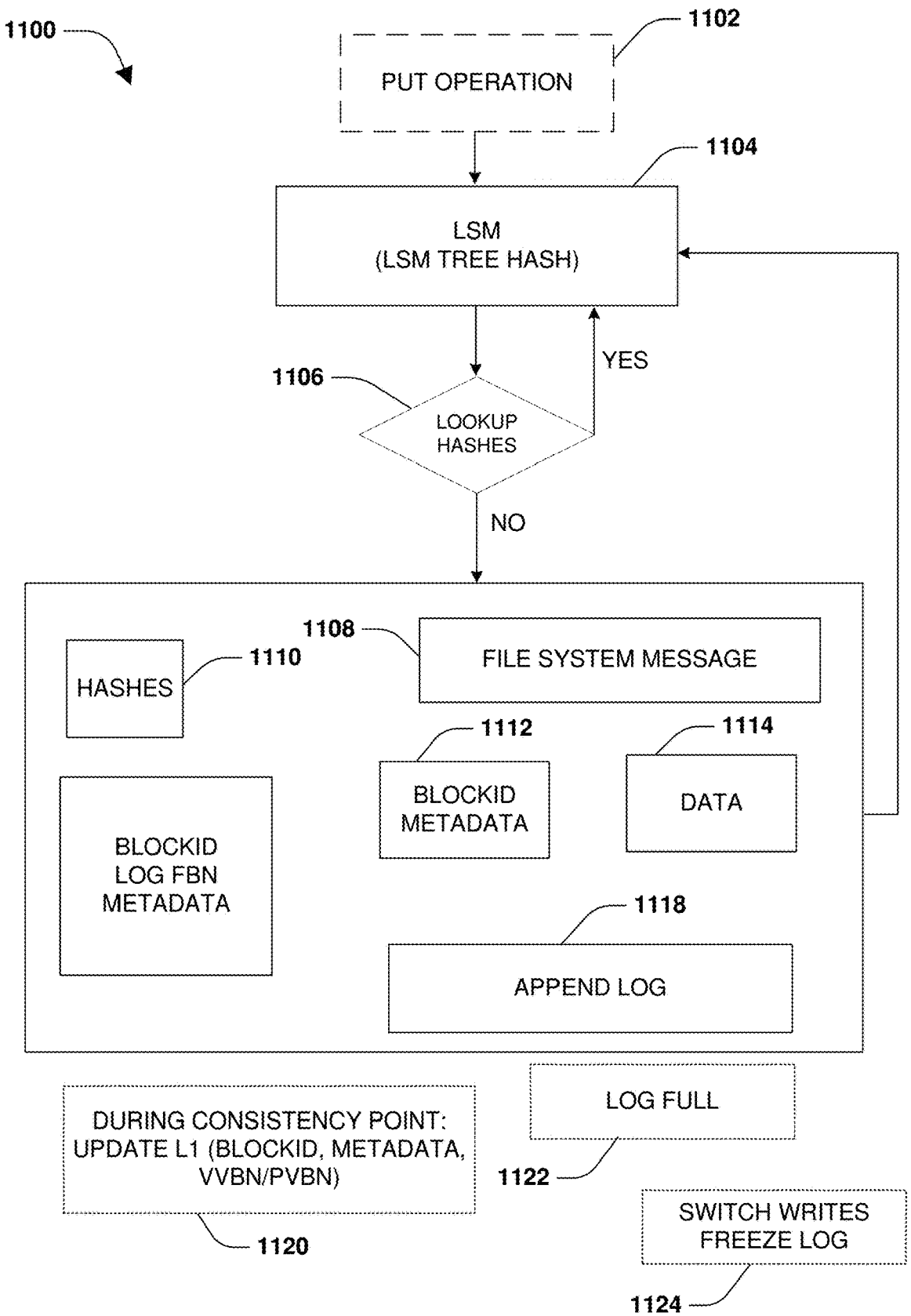
FIG. 11 is a flow chart illustrating an example of a set of operations that support key-value store and file system integration in accordance with an embodiment of the invention.

One embodiment of processing a put operation 1102 for a key-value store is illustrated by an exemplary method 1100 of FIG. 11. The put operation 1102 may be directed to a log structured merge tree 1104 having a log structured merge tree hash. The put operation 1102 first performs a lookup 1106 in an active append log hash. If the key (e.g., a block identifier (BID)) exists, then a write of the put operation 1102 is skipped. Next, a look up to a frozen append log hash is performed. If the key (e.g., the block identifier (BID)) exists, then the write of the put operation 1102 is skipped. Next, a bloom filter chunk is traversed to ensure the key does not exist. After, a next entry within an append log 1118 is obtained for the write. If memory used by the hashes 1110 exceeds a threshold, then the put operation 1102 is failed. Otherwise, an entry is added into the active append log hash with a reference to point to the data 1114 of the put operation 1102. Block identifier metadata 1112 is appended to an L1 indirect block of the append log 1118 as part of a consistency point 1120, and the data 1114 is added to an L0 direct block. As part of the consistency point 1120, a file system message 1108 is generate to have the file system point the L1 indirect block to a virtual volume block number and/or physical volume block number of the data 1114. Once the active append log is full 1122 and another append log is empty, the active append log is frozen 1124 and subsequent writes are directed to the other append log.

Figure 12:
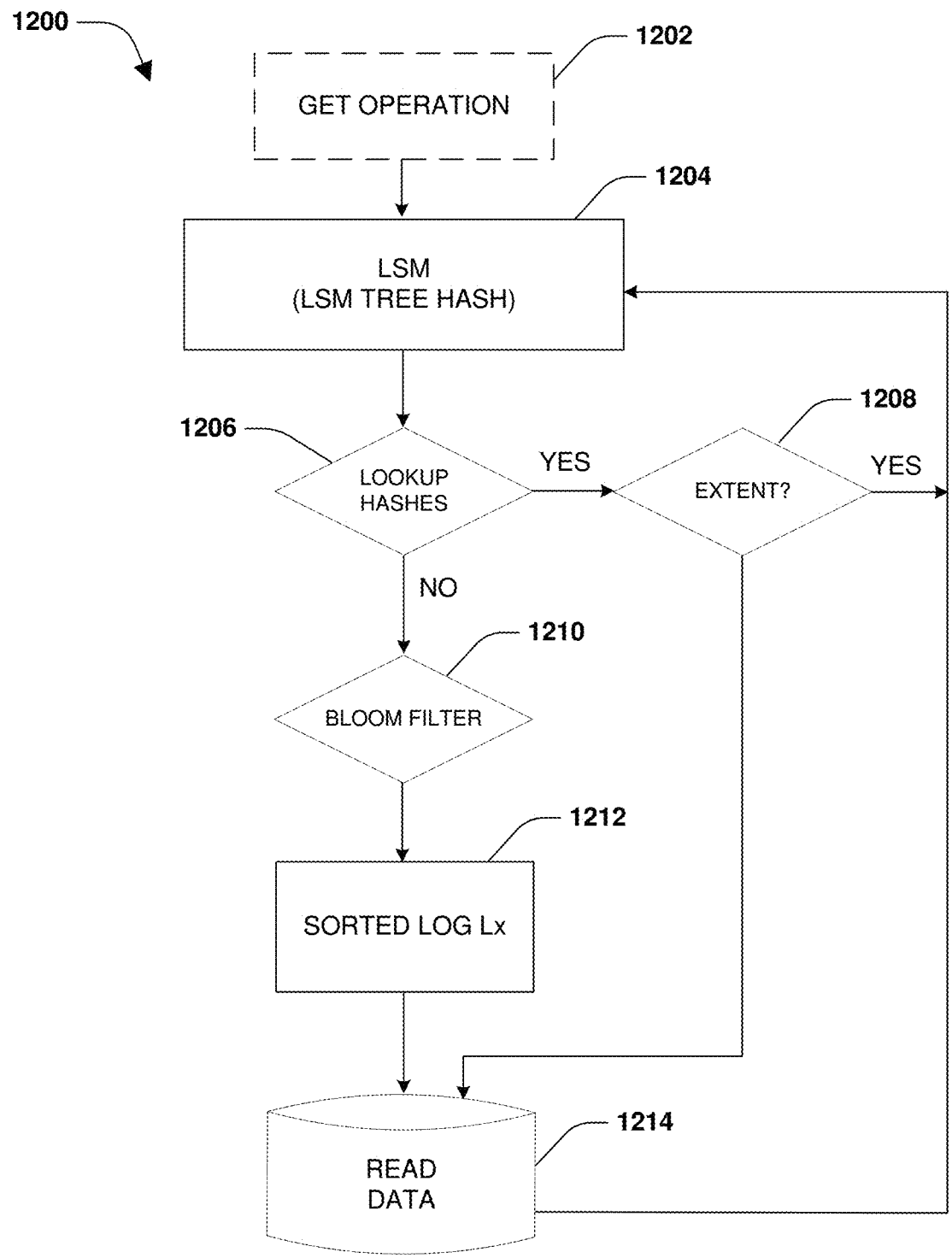
FIG. 12 is a flow chart illustrating an example of a set of operations that support key-value store and file system integration in accordance with an embodiment of the invention.

One embodiment of processing a get operation 1202 for a key-value store is illustrated by an exemplary method 1200 of FIG. 12. A lookup 1206 of a log structured merged tree 1204 is performed to identify a key to log structured merge tree mapping (e.g., a BIN to LSM tree mapping). For recent data, a lookup 1208 is performed to an append log hash. If not found, then a get message is sent to a file system to perform a read. If an active append log and frozen append log exist, then a virtual volume block number and a physical volume block number are used to read a block targeted by the get operation 1202 from disk. Next, a lookup 1210 is performed to bloom filter chunks within each level of the log structured merge tree. If the block exists in a bloom filter chunk, then a search (e.g., a binary search or a random distribution search if there is a uniform random key distribution in a sorted log 1212) on a block index is performed to find a file block number (fbn) of metadata. Next, a metadata block is read using the fbn in order to identify the virtual volume block number and physical volume block number used to read 1214 the data from disk.

Figure 13:
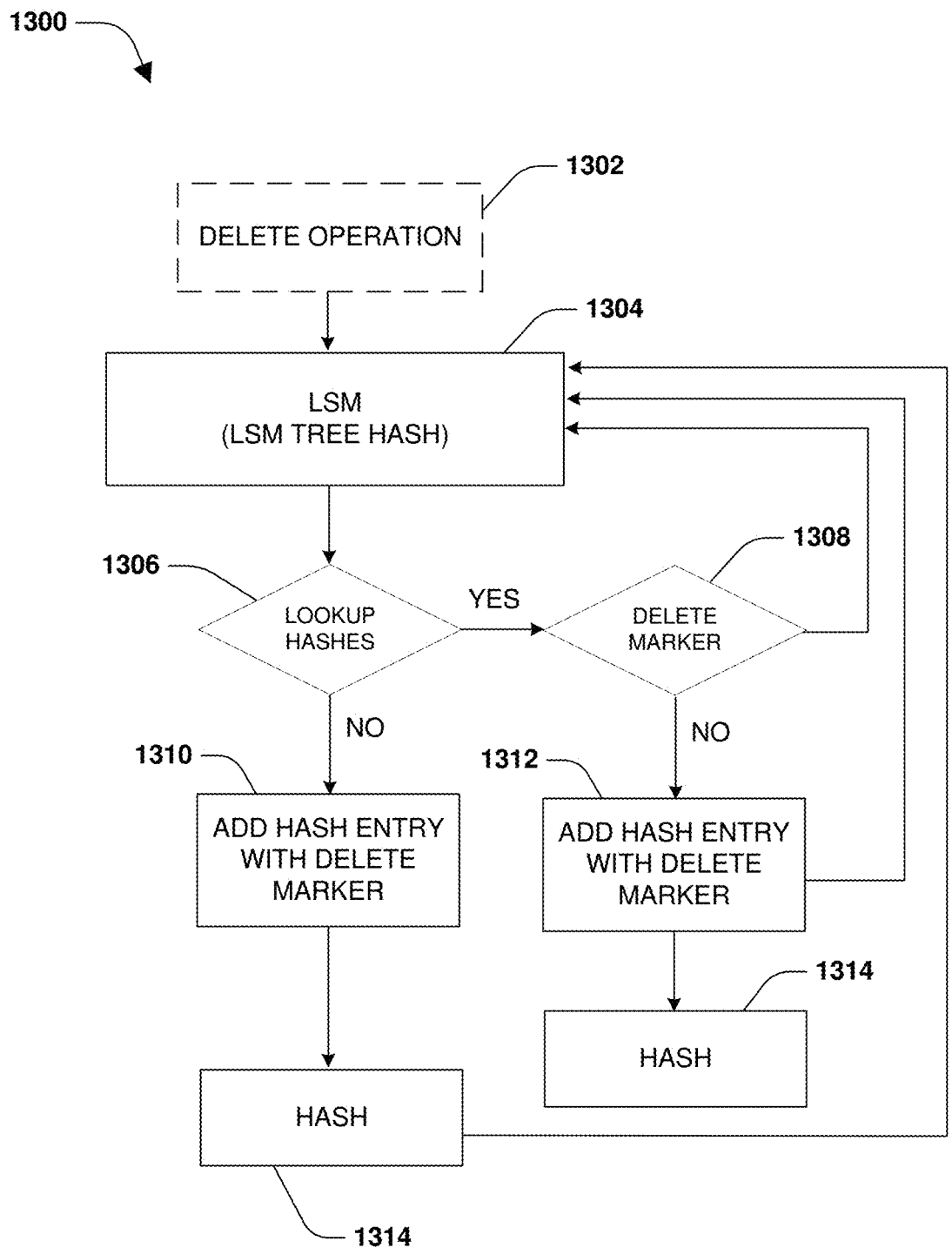
FIG. 13 is a flow chart illustrating an example of a set of operations that support key-value store and file system integration in accordance with an embodiment of the invention.

One embodiment of processing a delete operation 1302 for a key-value store is illustrated by an exemplary method 1300 of FIG. 13. A lookup 1306 of a log structured merged tree 1304 is performed to identify a key to log structured merge tree mapping (e.g., a BIN to LSM tree mapping). If a hash entry is not found, then a hash entry with a delete marker is added 1310 to a hash 1314. If the hash entry is found and is associated with the delete marker, then no further action is performed. If the hash entry is found without the delete marker, then the hash entry with the delete marker 1312 is added to the hash 1314.

In some embodiments, an append log to sorted log merge operation may be performed. When an active append log reaches a threshold fullness, the active append log is frozen and is marked for merging. At the end of a consistency point where data if flushed to storage, log structured merge trees associated with a volume are checked to see if any of the log structured merge trees are marked for being merged. If a log structured merge tree is marked for being merged, then a procedure is performed to sort a frozen append hash by adding the frozen append hash to an in-memory map as an in-memory sorted map, and a message of such is provided to a file system.

The file system loads a frozen sorted log block, and iterates over an in-memory sorted map in order to merge entries in the frozen sorted log block and write the sorted entries in an active sorted log file. The file system updates a block index and bloom filter in an active lookup file. For each entry in the in-memory sorted map, the file system copies a block identifier (BID), a virtual volume block number, and a physical volume block number into a sorted log. If an entry in the in-memory sorted map has a delete marker, the merge operation will move the deleted entry to an active delete sorted log if the frozen sorted log has the block identifier. If the frozen sorted log does not have the block identifier, then the block identifier is added to the active sorted log with a delete marker.

In some embodiments, a sorted log merge operation is performed. When a current level sorted log reaches a threshold fullness, a merge to a next level sorted log is triggered. Frozen sorted log blocks are loaded form the current level sorted log and the next level sorted log. Entries of the loaded frozen sorted blocks are merged and written to a next level active sorted log. A block index and bloom filer in an active lookup file are updated. If an entry is marked for deletion and the next level frozen sorted log has a block identifier of the entry, then the entry is added to an active delete sorted log and is not written to the active sorted log. The active delete sorted log is truncated at the end of the sorted log merge operation. If the entry is not found in the next level frozen sorted log, then a delete marker entry is written to the active sorted log.

Figure 14:
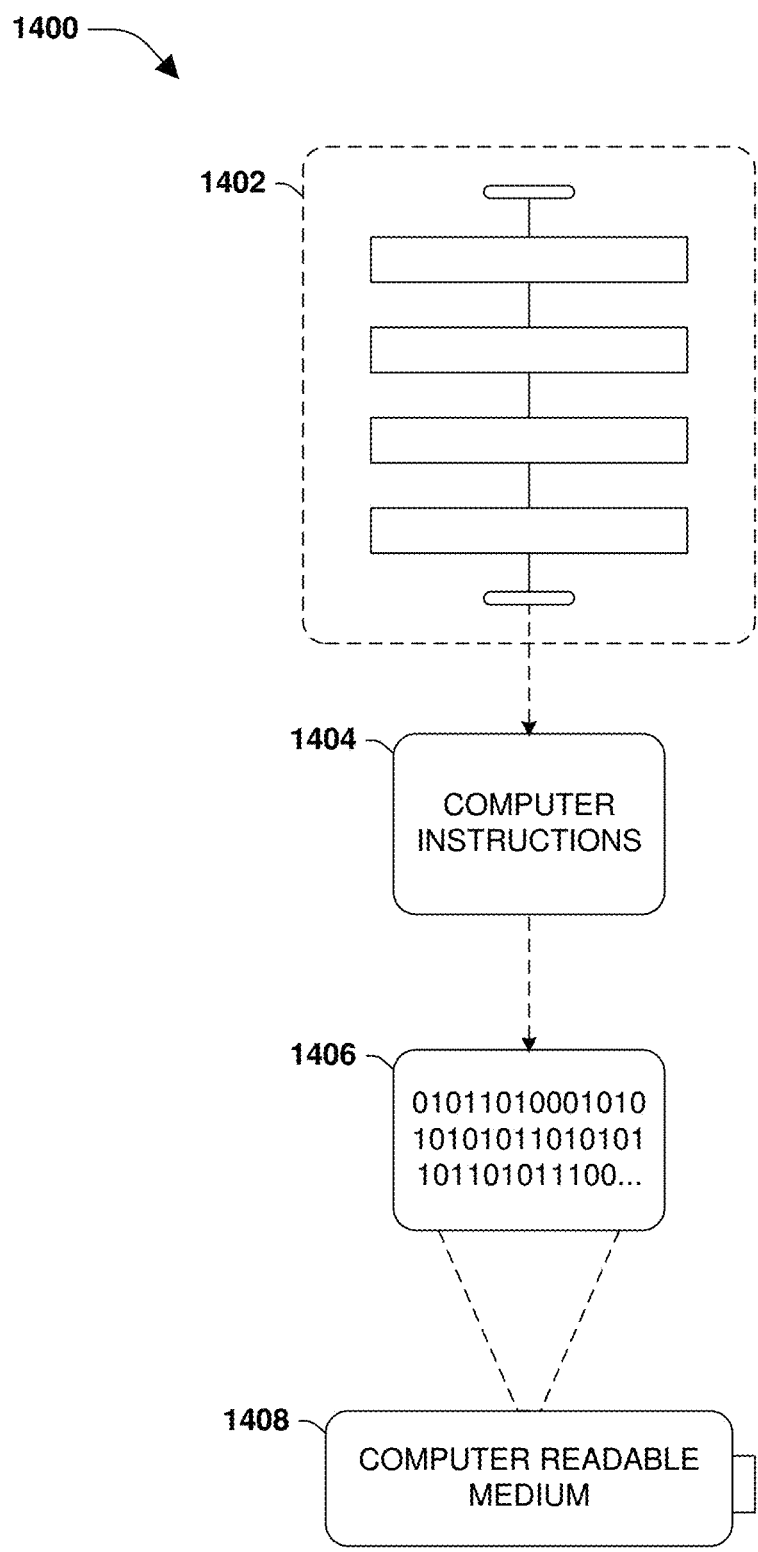
FIG. 14 is an example of a computer readable medium in which an embodiment of the invention may be implemented.

Still another embodiment involves a computer-readable medium 1400 comprising processor-executable instructions configured to implement one or more of the techniques presented herein. An example embodiment of a computer-readable medium or a computer-readable device that is devised in these ways is illustrated in FIG. 14, wherein the implementation comprises a computer-readable medium 1408, such as a compact disc-recordable (CD-R), a digital versatile disc-recordable (DVD-R), flash drive, a platter of a hard disk drive, etc., on which is encoded computer-readable data 1406. This computer-readable data 1406, such as binary data comprising at least one of a zero or a one, in turn comprises processor-executable computer instructions 1404 configured to operate according to one or more of the principles set forth herein. In some embodiments, the processor-executable computer instructions 1404 are configured to perform a method 1402, such as at least some of the exemplary method 400 of FIG. 4, at least some of the exemplary method 600 of FIG. 6, at least some of the exemplary method 800 of FIG. 8, at least some of the exemplary method 1100 of FIG. 11, at least some of the exemplary method 1200 of FIG. 12, and/or at least some of the exemplary method 1300 of FIG. 13, for example. In some embodiments, the processor-executable computer instructions 1404 are configured to implement a system, such as at least some of the exemplary system 500 of FIG. 5, at least some of the exemplary system 700 of FIG. 7, at least some of the exemplary system 1400 of FIG. 14, and/or at least some of the exemplary system 1000 of FIG. 10, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A method, implemented by a processor of a node, comprising:
    maintaining, within a storage device by the processor, a key-value store integrated within a file system of the node;
    creating, by the processor, a set of keyspaces for keys tracked by the key-value store, wherein a set of keys are uniformly distributed within a keyspace;
    populating, by the processor, a log structured merge tree, associated with the keyspace of the key-value store, with a key corresponding to a content hash of a value data item stored separate from the key;
    performing, by the processor, a random distribution search to identify a location of the key within a sorted log of the log structured merge tree, wherein the random distribution search is performed according to a constant time, wherein a starting location for the random distribution search is derived from key information, a log size of the sorted log, and a keyspace size of the keyspace associated with the key, and wherein the random distribution search is performed by loading a single block into memory based on a determination that the single block is not already in the memory; and
    utilizing, by the processor, the key to access the value data item.

2. The method of claim 1, comprising:
    storing a portion of each key of the set of keys within the keyspace based upon the set of keys being equally distributed within the keyspace.

3. The method of claim 1, wherein the performing the random distribution search comprises:
    identifying the location of the key based upon a formula derived from the key, the log size of the sorted log, and the keyspace size of the keyspace.

4. The method of claim 1, wherein the random distribution search is performed in a timespan shorter than a binary search having an O(log N) cost.

5. The method of claim 1, comprising:
performing a data management operation upon the keyspace of the set of keyspaces,
wherein the data management operation corresponds to at least one of a snapshot operation, enforcement of a quality of service policy, execution of a selected compression technique, or implementation of a tiering technique.

6. The method of claim 1, comprising:
defining the keyspace to comprise the set of keys corresponding to a set of value data items that share a characteristic.

7. The method of claim 1, comprising:
storing keyspaces of the set of keyspaces within separate aggregates and storage groups.

8. A computing device comprising:
a memory comprising machine executable code; and
a processor coupled to the memory, the processor configured to execute the machine executable code to cause the computing device to:
maintain a key-value store integrated within a file system of a node;
create a set of keyspaces for keys tracked by the key-value store, wherein a set of keys are uniformly distributed within a keyspace;
populate a log structured merge tree, associated with the keyspace of the key-value store, with a key corresponding to a content hash of a value data item stored separate from the key;
perform a random distribution search to identify a location of the key within a sorted log of the log structured merge tree, wherein the random distribution search is performed according to a constant time, wherein the random distribution search identifies the location of the key based upon a formula derived from the key, a log size of the sorted log, and a keyspace size of the keyspace, and wherein the random distribution search is performed by loading a single block into memory; and
utilize the key to access the value data item.

9. The computing device of claim 8, wherein the machine executable code when executed further causes the computing device to:
store a portion of each key of the set of keys within the keyspace based upon the set of keys being equally distributed within the keyspace.

10. The computing device of claim 8, wherein the random distribution search is performed in O(1) for identifying the key.

11. The computing device of claim 8, wherein the random distribution search is performed in O(1) for identifying the key faster than a binary searching having an O(log N) cost.

12. The computing device of claim 8, wherein the machine executable code when executed further causes the computing device to:
perform a data management operation upon the keyspace of the set of keyspaces,
wherein the data management operation corresponds to at least one of a snapshot operation, enforcement of a quality of service policy, execution of a selected compression technique, or implementation of a tiering technique.

13. The computing device of claim 8, wherein the machine executable code when executed further causes the computing device to:
define the keyspace to comprise the set of keys corresponding to a set of value data items that share a characteristic.

14. The computing device of claim 8, wherein the machine executable code when executed further causes the computing device to:
store keyspaces of the set of keyspaces within separate aggregates and storage groups.

15. A non-transitory machine readable medium comprising instructions, which when executed by a machine, causes the machine to:
store keys within a sorted log of a log structured merge tree for a key-value store integrated within a file system of a node, wherein a key corresponds to a to a content hash of a value data item stored separate from the key;
maintain a pageable bloom filter for a buftree used to store the key-value store,
wherein the pageable bloom filter is split into multiple bloom filter chunks to reduce write amplification when committing the pageable bloom filter to storage across multiple filesystem consistency point operations;
utilize a bloom filter chunk of the pageable bloom filter to determine whether the key exists within a level of the log structured merge tree; and
in response to determining that the key exists within the level of the log structured merge tree, perform a random distribution search to retrieve the key from a location for accessing the value data item, wherein the random distribution search identifies the location of the key based upon a formula derived from the key, a log size of the sorted log, and a keyspace size of a keyspace, and wherein the random distribution search is performed by loading a single block into memory based on a determination that the single block is if not already in the memory.

16. The non-transitory machine readable medium of claim 15, wherein the instructions when executed further cause the machine to:
split the pageable bloom filter into a first bloom filter chunk corresponding to a first level of the log structured merge tree and a second bloom filter chunk corresponding to a second level of the log structured merge tree.

17. The non-transitory machine readable medium of claim 15, wherein the pageable bloom filter is split into the multiple bloom filter chunks for loading a single chunk into memory while performing a randomized lookup as part of the random distribution search to the key-value store.

18. The non-transitory machine readable medium of claim 15, wherein the instructions when executed further cause the machine to:
store, within the log structured merge tree, a log structured merge info file, an append log hash, an append log, a lookup file comprising a block index, the pageable bloom filter, and a bloom filter chunk index file as an index to the pageable bloom filter.

19. The non-transitory machine readable medium of claim 18, wherein the sorted log comprising keys corresponding to virtual volume block numbers and physical volume block numbers of value data items associated with the keys.

20. The non-transitory machine readable medium of claim 15, wherein the instructions when executed further cause the machine to:

utilizing at least one of a virtual volume block number or a physical volume block number associated with the key to implement a read operation to read the value data item.

\* \* \* \* \*